United States Patent [19]
Mizuno et al.

[11] Patent Number: 5,588,409
[45] Date of Patent: Dec. 31, 1996

[54] IGNITION TIMING CONTROL DEVICE FOR AN ENGINE

[75] Inventors: Hiroyuki Mizuno, Toyota; Akio Okamoto, Takahama; Suehiro Kubo, Toyota, all of Japan

[73] Assignee: Toyota Jidosha Kabushiki Kaisha, Toyota, Japan

[21] Appl. No.: 497,894

[22] Filed: Jul. 3, 1995

[30] Foreign Application Priority Data

Jul. 19, 1994 [JP] Japan ................................. 6-166924
Apr. 28, 1995 [JP] Japan ................................. 7-106442

[51] Int. Cl.⁶ ............................. F02D 41/16; F02P 5/15
[52] U.S. Cl. ........................... 123/339.11; 123/339.15
[58] Field of Search ..................... 123/339.11, 339.14, 123/339.15, 339.23

[56] References Cited

U.S. PATENT DOCUMENTS

| | | | |
|---|---|---|---|
| 4,506,639 | 3/1985 | Murakami et al. | 123/339.11 |
| 4,582,032 | 4/1986 | Hara et al. | 123/339.11 |
| 4,732,125 | 3/1988 | Takizawa | 123/339.11 |
| 5,000,147 | 3/1991 | Hill | 123/339.11 |
| 5,138,995 | 8/1992 | Erhard | 123/339.11 |
| 5,408,871 | 4/1995 | Lieder et al. | 123/339.11 |
| 5,445,124 | 8/1995 | Tomisawa et al. | 123/339.11 |

FOREIGN PATENT DOCUMENTS

| | | |
|---|---|---|
| 60-156979 | 8/1985 | Japan . |
| 62-93455 | 4/1987 | Japan . |
| 3-37352 | 2/1991 | Japan . |
| 3111652 | 5/1991 | Japan . |
| 4-301159 | 10/1992 | Japan . |

*Primary Examiner*—Willis R. Wolfe
*Attorney, Agent, or Firm*—Oliff & Berridge

[57] ABSTRACT

An ignition timing control device is provided that includes an engine load condition detecting device, a failure detecting device and an ignition retarding device. The engine load condition detecting device detects a load condition of the engine. The failure detecting device detects the failure of an idle speed control device. An ignition retarding device retards the ignition timing of the engine by an amount based on the determined engine load conditions when the idle speed control device fails.

13 Claims, 14 Drawing Sheets

IGNITION TIMING CONTROL DEVICE FOR AN ENGINE

BACKGROUND OF THE INVENTION

1. Field of the Invention

The present invention relates to an ignition timing control device for an engine having an idle speed control device for controlling the engine speed during an idle operation.

2. Description of the Related Art

An idle speed control device is used to maintain an engine speed at a predetermined target value during the idle operation regardless of changes in engine temperature and engine load. The idle speed control device is usually equipped with an inlet air bypass passage connecting the portions of the inlet air passage upstream and downstream of the throttle valve, and an idle speed control valve for controlling the airflow passing through the inlet air bypass passage. The idle speed control device adjusts the engine speed by controlling the amount of the inlet air supplied to the engine using the idle speed control valve, regardless of the degree of opening of the throttle valve, during the engine idle operation.

However, since the idle speed control device supplies inlet air regardless of the opening of the throttle valve, an operator of the engine cannot control the amount of inlet air by operating the throttle valve if the idle speed control device fails. Therefore, if the idle speed control is locked at its fully opened position due to the failure of the idle speed control device, an over-running in which the engine speed increases excessively, against the operator's wishes, may occur.

In order to prevent such over-running of the engine, various control devices have been proposed. For example, Japanese Unexamined Patent Publication (Kokai) No. 60-156979 discloses an ignition timing control device which retards the ignition timing of the engine in accordance with the engine speed when the speed of the engine in an idle operation exceeds a predetermined value. Since the engine output torque decreases as the ignition timing is retarded, the engine speed can be reduced by retarding the ignition timing. In the device in JPP'979, the over-running is prevented by retarding the ignition timing even if the idle speed control is locked at its fully opened position due to a failure of the idle speed control device.

However, the ignition timing control device in JPP'979 performs the ignition timing retarding operation only when the engine speed exceeds a predetermined value. This may cause problems in some cases. For example, the engine idle speed varies largely when the engine load changes. Therefore, when relatively large load is exerted on the engine, for example, when an air conditioner is ON, the engine idle speed does not increase excessively even if the idle speed control valve is locked at its fully opened position. Since the device in JPP'979 does not retard the ignition timing when the engine speed is lower than a predetermined value, if the air conditioner is ON, the ignition timing is not retarded even when a failure of the idle speed control device occurs. In this case, if the air conditioner switch is turned off, the engine speed suddenly increases and a temporary over-running occurs until the ignition timing is retarded to an appropriate value.

Further, the device in JPP'979 performs the retarding operation of the ignition timing only when the valve is fully closed. However, if the idle speed control valve is locked at its fully opened position due to a failure of the idle speed control device, over-running of the engine can occur even when the engine is operated in a low load condition (i.e., when the throttle valve is not fully closed) in the actual operation of the engine. Therefore, it is difficult to prevent the over-running of the engine if the ignition timing retarding is performed only when the throttle valve is fully closed.

In order to prevent over-running of the engine during low load operation of the engine, the ignition timing may be retarded in accordance with the engine speed when the throttle valve is opened. However, if the ignition timing retarding operation is performed regardless of the engine load when the throttle valve is opened, other problems may occur. For example, when the engine is operated at a relatively high load, the engine operation is not affected even if the idle speed control valve is locked at its fully opened position due to the failure of the idle speed control device since the amount of the inlet air of the engine is relatively large in a high load operation and the increase in the amount of inlet air caused by the failure of the idle speed control device is small when compared with the total amount of inlet air of the engine. Therefore, when the engine is operated in a relatively high load, it is not necessary to retard the ignition timing even if the idle speed control device fails. Further, if the ignition timing is retarded in such conditions, a shortage of the engine output torque and an excessive temperature rise of the exhaust gas may be caused by the ignition timing retarding. Therefore, it is not preferable to perform the ignition timing retarding when the engine operating load is relatively high even when a failure of the idle speed control device occurs.

SUMMARY OF THE INVENTION

In view of the problems in the related art set forth above, the object of the present invention is to provide an ignition timing control device for an engine which can effectively prevent over-running of the engine without affecting the engine operation even when the idle speed control device fails.

The above object is achieved by an ignition timing control device according to the present invention in which an ignition timing control device is applied to an engine equipped with an inlet air passage and a throttle valve disposed on the inlet air passage, an inlet air bypass passage connecting the portions of the inlet air passage upstream and downstream of the throttle valve for supplying inlet air to the engine without passing through the throttle valve, and an idle speed control means for controlling the speed of the engine during idle operation of the engine by adjusting the amount of air passing through the inlet air bypass passage. The ignition timing control device comprises an engine load condition detecting means for detecting the load condition of the engine, a failure detecting means for detecting a failure of the idle speed control means and an ignition retarding means for retarding the ignition timing by an amount determined in accordance with the engine load conditions detected by the engine load condition detecting means when the idle speed control means fails.

Since the amount of the ignition timing retarding is determined in accordance with the engine load conditions, the amount of the ignition timing retarding is small when the engine load is high compared to when the engine load is low. Therefore, when the idle speed control valve is locked at its fully opened position due to the failure of the idle speed control device, the over-running of the engine when the engine load is low, and a shortage of the engine output torque or an excessive exhaust gas temperature rise when the engine load is high are both prevented from occurring.

According to another aspect of the present invention, there is provided an ignition timing control device for an engine having an inlet air bypass passage connecting the portions of the inlet air passage upstream and downstream of the throttle valve for supplying inlet air to the engine without passing through the throttle valve, and an idle speed control means for controlling the speed of the engine during the idle operation of the engine by adjusting the amount of air passing through the inlet air bypass passage. The ignition timing control device comprises a failure detecting means for detecting a failure of the idle speed control means, an ignition retarding means for retarding the ignition timing by a predetermined amount when the idle speed control means fails, a setting means for setting the limiting value of the ignition timing advancing rate and a limiting means for limiting the actual advancing rate of ignition timing to less than the limiting value, wherein the setting means sets the limiting value smaller when the idle speed control means fails than the limiting value when the idle speed control means is normal.

When the ignition timing is retarded, the sensitivity of the engine output torque to the ignition timing increases. Therefore, when the ignition timing is advanced from the retarded condition, if the advancing rate is the same as that in the normal ignition timing, the engine output torque increases suddenly. This causes poor drivability. In this aspect of the present invention, when the ignition timing is retarded, the ignition timing advancing rate is limited to a smaller value than in a normal operation. Therefore, when the ignition timing is retarded, the ignition timing advances more slowly than in the normal operation, and a sudden increase in the engine output torque does not occur.

Further, according to another aspect of the present invention, there is provided an ignition timing control device for an engine having an inlet air passage and a throttle valve disposed on the inlet air passage, an inlet air bypass passage connecting the portions of the inlet air passage upstream and downstream of the throttle valve for supplying inlet air to the engine without passing through the throttle valve, and an idle speed control means for controlling the speed of the engine during idle operation of the engine by adjusting the amount of air passing through the inlet air bypass passage. The ignition timing control device comprises a failure detecting means for detecting the failure of the idle speed control means, an ignition retarding means for retarding the ignition timing by a predetermined amount when the idle speed control means fails, a determining means for determining whether the amount of air passing through the inlet air bypass passage decreases due to the failure of the idle speed control means and a prohibiting means for prohibiting the ignition retarding means from retarding the ignition timing of the engine when it is determined that the amount of air passing through the inlet air bypass passage has decreased due to the failure of the idle speed control means.

When the amount of air passing through the bypass air passage decreases due to the failure of the idle speed control device, for example, when the idle speed control valve is locked at its fully closed position, there is no possibility for over-running of the engine. Therefore it is not necessary to retard the ignition timing. In this aspect of the present invention, when the amount of inlet air decreases due to the failure of the idle speed control device, retarding operation of the ignition timing is not performed.

BRIEF DESCRIPTION OF THE DRAWINGS

The present invention will be better understood from the description as set forth hereinafter, with reference to the accompanying drawings, in which.

DESCRIPTION OF THE PREFERRED EMBODIMENT

Figure 1:
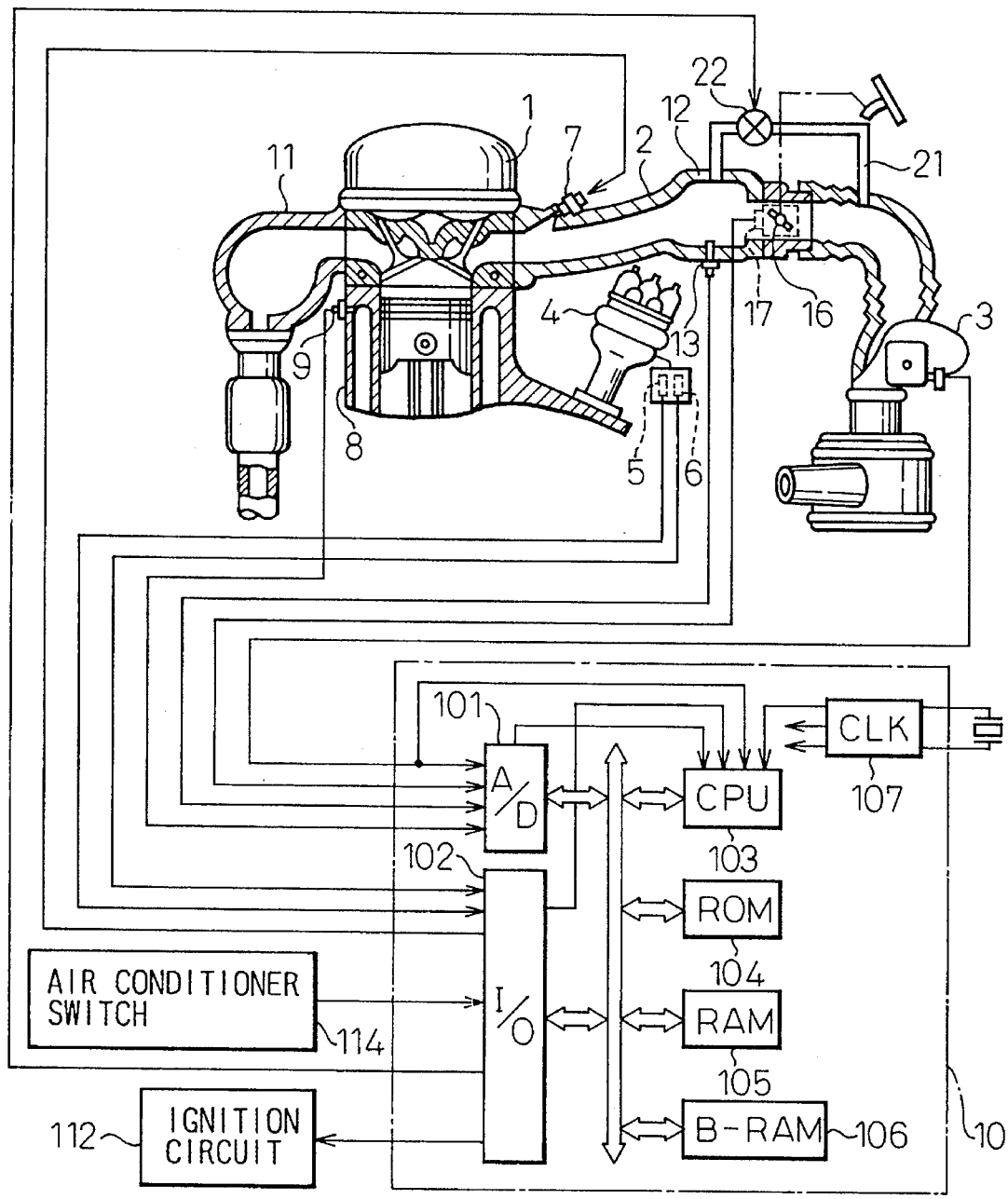
FIG. 1 is a drawing schematically illustrating an embodiment of the ignition timing control device of the present invention applied to an automobile engine.

FIG. 1 schematically illustrates an embodiment of the air-fuel ratio control device according to the present invention.

In FIG. 1, reference numeral 1 represents an internal combustion engine for an automobile. An air inlet passage 2 of the engine 1 is provided with a potentiometer-type air-flow meter 3 for detecting the amount of air drawn into the engine 1 and generates an analog voltage signal proportional to the amount of air flowing therethrough. The signal from the air-flow meter 3 is transmitted to a multiplexer-incorporating analog-to-digital (A/D) converter 101 of the control circuit 10.

A throttle valve 16, to be operated by the vehicle driver, is provided in the inlet air passage 2, together with a throttle opening sensor 17 for generating an analog signal (a TH signal) corresponding to the degree of opening of the throttle valve 16. This TH signal is fed to the A/D converter 101 of the control circuit 10.

Crank angle sensors 5 and 6, for detecting the rotation angle of the crankshaft (not shown) of the engine 1, are disposed at a distributor 4 of the engine 1.

In this embodiment, the crank angle sensor 5 generates a pulse signal at every 720° of crank angle and the crank angle sensor 6 generates a pulse signal at every 30° of crank angle. The pulse signals from the crank angle sensors 5 and 6 are supplied to an input/output (I/O) interface 102 of the control circuit 10.

Further, the pulse signal of the crank angle sensor 6 is then fed to an interrupt terminal of a central processing unit (CPU) 103.

In the inlet passage 2, a fuel injection valve 7 is provided at an inlet port of each cylinder of the engine 1, for supplying pressurized fuel from the fuel system (not shown) to the cylinders of the engine.

In this embodiment, an air bypass passage 21 which connects the portions of the inlet air passage 2 upstream and downstream of the throttle valve 16 is provided. In the air bypass passage 21, an idle speed control valve 22 which is, in this embodiment, a two-solenoid rotary type idle speed control valve is disposed. During an idle operation and a low load operation of the engine 1, the amount of inlet air supplied to the engine is controlled by adjusting the amount of bypass air flowing through the air bypass passage 21 by adjusting the degree of opening of the idle speed control valve 22.

A coolant temperature sensor 9 for detecting the temperature of the coolant is disposed on a water jacket of a cylinder block 8 of the engine 1. The coolant temperature sensor 9 generates an analog voltage signal in response to the temperature THW of the coolant, and transmits this signal to the A/D converter 101 of the control circuit 10.

The control circuit 10, which may consist of a microcomputer, comprises a central processing unit (CPU) 103, a read-only-memory (ROM) 104 for storing a main routine and interrupt routines such as a fuel injection routine and an ignition timing control routine, and constants, etc., a random-access-memory (RAM) 105 for storing temporary data, and a clock generator 107 for generating various clock signals. The ECU 10 performs basic control of the engine 1 such as fuel injection control and ignition timing control.

In this embodiment, the ECU 10 further performs idle speed control of the engine 1 in which the engine speed during the idle operation (i.e., the operation of the engine in which the degree of opening of the throttle valve TH is less than a predetermined value), is maintained at a predetermined target value by adjusting the amount of inlet air flow using the idle speed control valve 22. Further, the ECU 10 detects a failure of the idle speed control valve 22 and performs an ignition timing retarding operation when the idle speed control valve 22 fails, in order to prevent a over-running of the engine 1. The ignition timing retarding control is explained later in detail.

To perform the ignition timing control, the I/O interface 102 is connected to an ignition circuit 112. The ECU 10 detects a reference crank position for each cylinder (for example, 60° before the top dead center in the compression stroke of each cylinder, i.e., 60° BTDC) based on the pulse signals from the crank angle sensors 5 and 6. The ECU 10 also converts the ignition timing calculated by the routine explained later to an angle of rotation of the crankshaft from the reference crank position. Then, the ECU 10 generates ignition signals when the crankshaft rotates the converted angle after it reaches the reference crank position of the respective cylinder to spark ignition plugs (not shown) of the respective cylinders. When the idle speed control device works normally, the optimum ignition timing is determined in accordance with the engine load conditions such as the engine load (for example, the amount of inlet air per one revolution of the crankshaft) and the engine speed. The optimum ignition timing (the base ignition timing) is stored in the ROM 104 in a form of a numerical table based on the values of the engine load and the engine speed.

The inlet air amount data Q from the air-flow meter 3 and the coolant temperature data THW from the coolant sensor 9 are fetched by an A/D conversion routine(s) executed at predetermined intervals, and then stored in predetermined areas in the RAM 105; i.e., the data Q and THW in the RAM 105 are updated at predetermined intervals. The engine speed N is calculated by an interrupt routine executed at every 30° crank angle, i.e., at every pulse signal of the crank angle sensor 6, and is stored in a predetermined area in the RAM 105.

Figure 2:
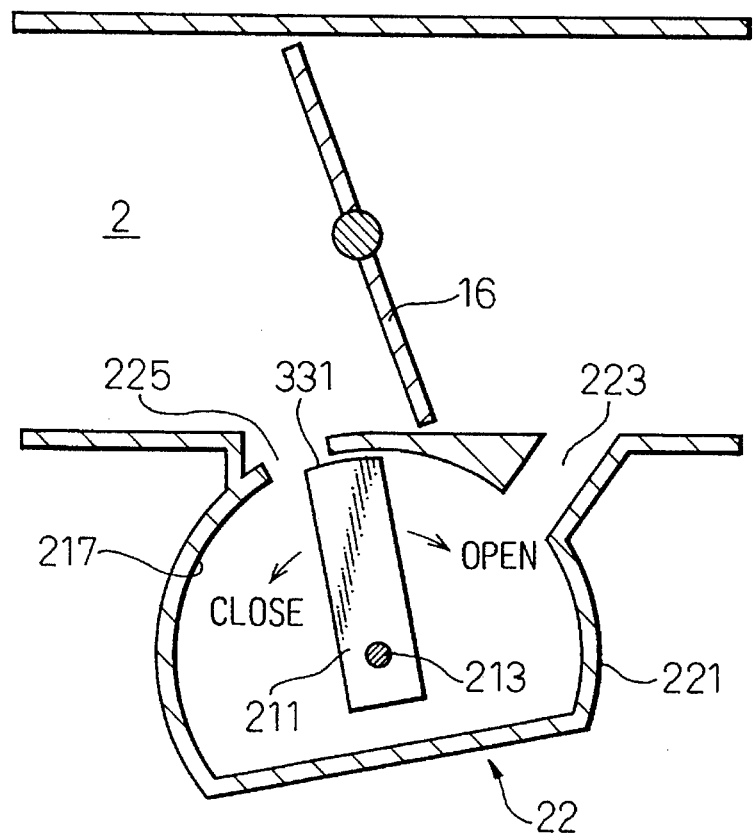
FIG. 2 is a drawing schematically showing a typical construction of a two-solenoid rotary type idle speed control valve used in the embodiment in FIG. 1.

FIG. 2 schematically illustrates a typical construction of the two-solenoid rotary type idle speed control valve which is used as the idle speed control valve 22 in this embodiment. In FIG. 2, numeral 221 designates a housing of the idle speed control valve 22 secured to the wall of the inlet air passage 2 at the portion of throttle valve 16. Numerals 223 and 225 in FIG. 2 designate an inlet port and an outlet port of the housing 221, respectively. The inlet port 223 connects the inside of the housing 221 to the portion of the inlet air passage 2 upstream of the throttle valve 16, and the outlet port 225 connects the inside of the housing 221 to the portion of the inlet air passage 2 downstream of the throttle valve 16. Namely, the inlet port 223, housing 221 and outlet port 225 in FIG. 2, in combination, form the air bypass passage 21 in FIG. 1.

Figure 3:
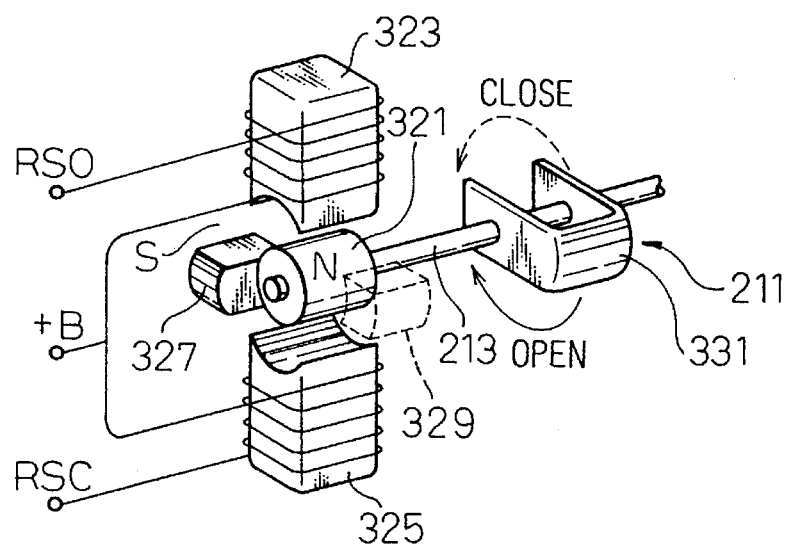
FIG. 3 is a drawing illustrating the drive mechanism of a two-solenoid rotary type idle speed control valve.

In the housing 221 of the idle speed control valve 22, a valve body 211 is disposed. The valve body 211 is formed by bending a piece of metal strip into a U-shape, as shown in FIG. 3. A drive shaft 213 penetrating the portions of the valve body 211 corresponding to two vertical sides of the U-shape is provided to allow the valve body 211 to turn around the axis thereof. The housing 221 is formed in the shape of a cylinder split by a plane parallel to the center axis thereof. The drive shaft 213 of the valve body 211 further penetrates the housing 221 in a direction parallel to the center axis of the housing 221. A portion 331 of the valve body 211 which corresponds to the horizontal part of the U-shape maintains a sliding contact with the circular inner periphery 217 of the housing 221 when the valve body 211 is turned by the drive shaft 213. The inlet poor 223 and the outlet port 225 open on the circular inner periphery 217 of the housing 221. When the valve body 211 is turned by the drive shaft 213, the portion 331 of the valve body 211 covers the opening of the outlet port 225 on the inner periphery 217 of the housing 221. Therefore, the opening area of the outlet port 225 can be adjusted by turning the valve body 211 by activating the solenoids disposed around the drive shaft 213, as explained later. Thus, the amount of air passing through the idle speed control valve 22, i.e., the amount of air by-passing the throttle valve 16 can be controlled by turning the drive shaft 213.

FIG. 3 illustrates a drive mechanism for turning the drive shaft 213 of the idle speed control valve 22. In FIG. 3, numeral 321 shows a cylindrical permanent magnet attached to the drive shaft 213, numerals 323 and 325 designate drive solenoids facing the cylindrical surface of the permanent magnet 321. Further, permanent magnets (or alternatively, metal pieces) 327, 329 for determining a neutral valve position are secured to the housing 221 at the positions facing the cylindrical surface of the permanent magnet 321. As shown in FIG. 3, the windings of the drive solenoids 323 and 325 have directions of turns opposite to each other. The ends of the windings of the respective solenoids facing the permanent magnet 321 are connected to a positive terminal of a battery via a common terminal B. The other end of the winding of the solenoid 323 is connected to a relay circuit (not shown) via a terminal RSO in FIG. 3. Similarly, the other end of the winding of the solenoid 325 is connected to another relay circuit via a terminal RSC in FIG. 3. When electricity is fed to the solenoids 323 and 325, the solenoid 233 and solenoid 325 have polarities opposite to each other (for example, when the circuit is charged, the ends facing the permanent magnet 321 of both the solenoids 323 and 325 become N-poles in FIG. 3).

Since the ends of both the drive solenoids 323 and 325 facing the permanent magnet 321 have the same polarity (i.e., N-poles in FIGS. 3 and 4) when the solenoids are energized, the solenoid 323 and 325 drive the permanent magnet 321 in opposite directions. Namely, when the solenoid 323 is energized, a clockwise torque is exerted on the permanent magnet 321, and a counterclockwise torque is exerted on the permanent magnet 321 when the solenoid 325 is charged.

In this embodiment, when the permanent magnet 321 (and the drive shaft 213 connected thereto) turns clockwise in FIG. 2, the valve body 211 of the idle speed control valve 22 is turned in the direction that increases the opening area of the outlet port 225. On the other hand, when the permanent magnet 321 turns counterclockwise, the valve body 211 is turned in the direction that decreases the opening area of the outlet port 225.

Figure 4:
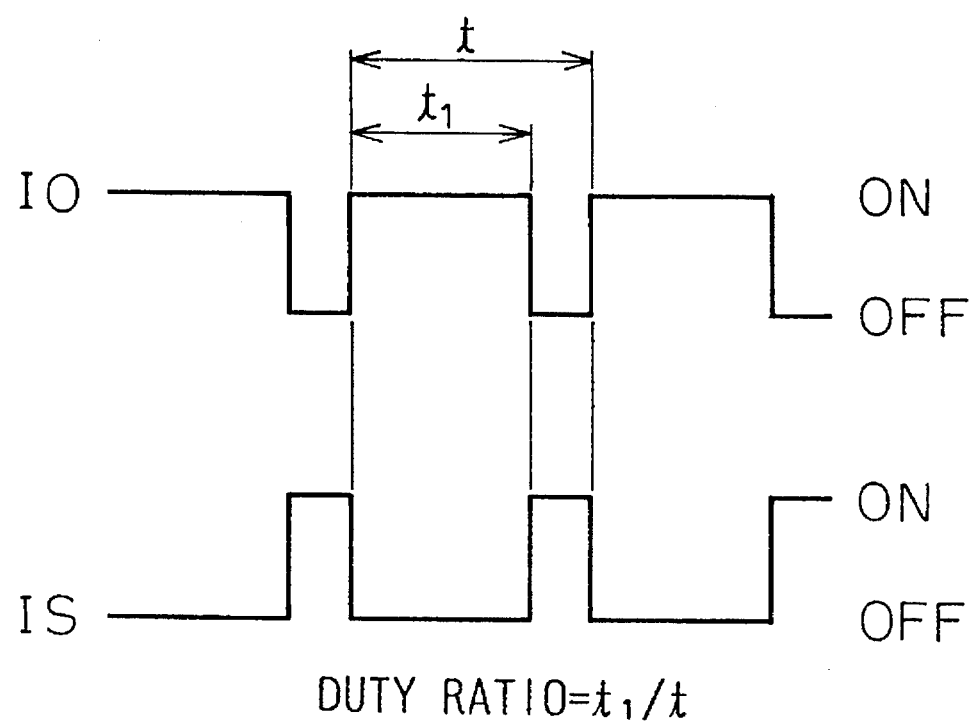
FIG. 4 is a diagram explaining the duty ratio of the control signal supplied to the drive mechanism of a two-solenoid rotary type idle speed control valve in FIG. 3.

In this embodiment, drive pulse voltage signals as shown in FIG. 4 are fed to the solenoids 323 and 325 by the closing/opening operations of the relay circuits connected to the terminals RSO and RSC, respectively. As shown in FIG. 4, the signals IO (drive signal of the solenoid 323) and IS (drive signal of the solenoid 325) are controlled in such a manner that IO and IS always has a phase opposite to each other, i.e., when the IO is on, the IS is off, and vice versa. The duty ratio of the drive signals are defined by $t_1/t$ in FIG. 4. Therefore, when the duty ratio of the drive signals increases, the amount of average electric current supplied to the solenoid 323 increases and the amount of average electric current supplied to the solenoid 325 decreases simultaneously.

The opening area of the outlet port 225 and hence the amount of air passing through the idle speed control valve 22 can be controlled by adjusting the duty ratio of drive signals supplied to the respective solenoids. For example, when the duty ratios of the drive signals are increased, the valve body 211 turns clockwise, and the amount of air passing through the bypass passage 21 increases. On the contrary, when the duty ratios of the drive signals are decreased, the valve body 211 turns counterclockwise, and the amount of air passing through the bypass passage 21 decreases.

Therefore, if the solenoid 325 which generates the drive force to close the port 225 fails, i.e., if the drive force of the solenoid 325 is lost, the valve body 211 turns counterclockwise due to the drive force of the other solenoid 323. In this case, the valve body 211 is locked at the position fully turned to counterclockwise direction, thus the port 325 is fully opened. Therefore, when the solenoid 325 fails, the amount of air passing through the bypass air passage 21, i.e., the amount of inlet air supplied to the engine increases. Thus over-running of the engine may occur.

Further, even if the solenoid 325 works normally, the over-running of the engine may occur if the valve body 211 is locked mechanically at the position fully opens the port 225, for example, by a foreign matter introduced between the valve body 211 and the housing 221.

Though the above explanation refers to the two-solenoid rotary type idle speed control valve, similar problems will also occur in other types of the idle speed control valve.

In this embodiment, the over-running of the engine upon the failure of the idle speed control valve is prevented by controlling the ignition timing of the engine in the following manner.

In this embodiment, when a failure of the idle speed control valve 22 is detected by the method explained below, the ECU 10 retards the ignition timing of the engine to prevent the over-running of the engine. Further, the amount of the ignition timing retarding is determined by the amount of inlet air, i.e., by the engine load conditions. As explained before, if the idle speed control valve fails, the over-running of the engine may occur when the throttle valve is opened. If the ignition timing retarding is carried out also when the throttle valve is opened to prevent the over-running regardless of the engine load conditions, problems such as a shortage of engine output or excessive temperature rise in the exhaust gas may occur. In this embodiment, these problems are prevented by determining the amount of the ignition timing retardation in accordance with the engine load conditions using the amount of inlet air as a parameter.

Figure 5:
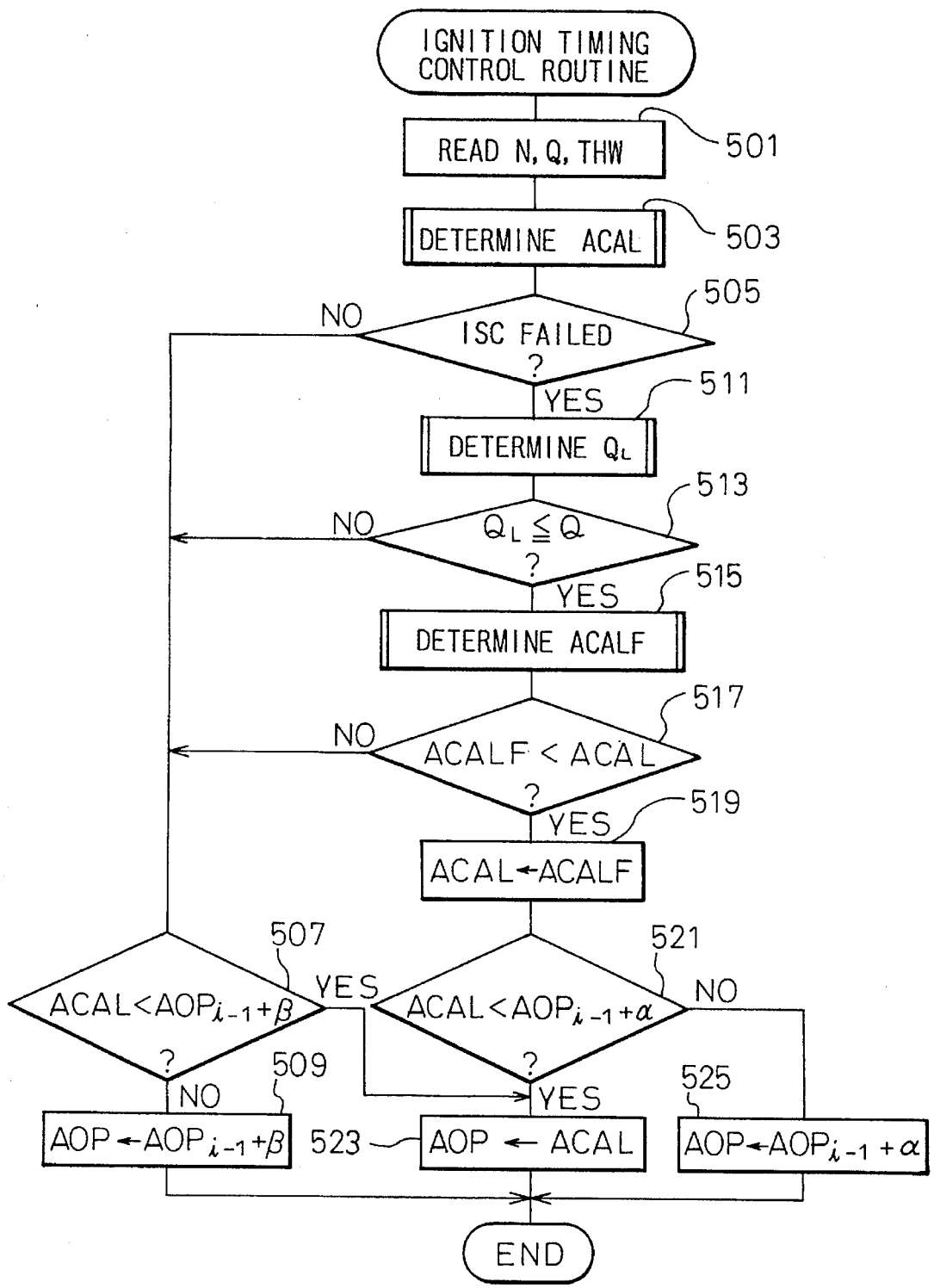
FIG. 5 is a flowchart explaining an embodiment of the ignition timing control according to the present invention.

FIG. 5 shows a flowchart of the ignition timing control routine of this embodiment. This routine is performed by the ECU 10 at predetermined intervals or at predetermined crank angles.

Figure 6:
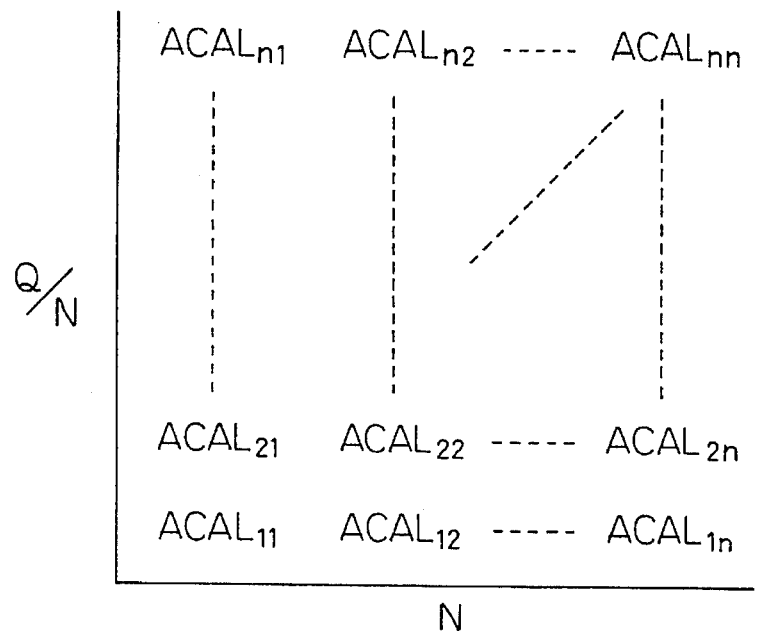
FIG. 6 shows an example of the form of the numerical table used in the ignition timing control in FIG. 5.

When the routine starts, at step 501 in FIG. 5, the engine speed data N, inlet air amount data Q and the coolant temperature data THW are read from the predetermined areas of the RAM 105. Then, at step 503, the base ignition timing (i.e., the optimum ignition timing when the idle speed control has not failed) ACAL is determined. As explained before, the values of the base ignition timing ACAL are stored in the ROM 104 of the ECU 10 in the form of the numerical table based on the engine load (the amount of inlet air per one revolution of the crankshaft, Q/N) and the engine speed N. FIG. 6 shows an example of the form of the numerical table (or map) used in this embodiment. At step 503, the value of the base ignition timing ACAL is determined by the map in FIG. 6 using the values of Q and N read at step 501.

At step 505, it is determined whether the idle speed control has failed. In this embodiment, since the two-solenoid rotary type idle speed control valve is used for the idle speed control valve 22, the failure of the idle speed control is determined by monitoring the voltages of the terminals RSO and RSC. Namely, if the idle speed control valve 22 is working normally, the drive pulse signals are fed to the solenoids 323 and 325 through the terminals RSO and RSC, respectively. Therefore, the voltage at the terminals RSO and RSC oscillate regularly in accordance with the drive signals supplied to the terminals. However, if the failure, such as a disconnection or short-circuiting occurs in one of the relay or solenoid circuits, the voltage of the terminal of the failed circuit remains a constant voltage while the voltage of the other terminal still oscillates regularly.

In this embodiment, the ECU 10 monitors the voltages of the terminals RSO and RSC in FIG. 2 by a routine (not shown) separately performed, and determines that the idle speed control has failed when the voltage of one of the terminals becomes constant while the voltage of the other terminal oscillates regularly during the idle speed control.

Though the above method of detecting the failure of the idle speed control is directed to detect the failure caused by a malfunction of the electric circuits (which is most likely to occur), other methods can be used to detect the failure of the idle speed control. For example, the actual amount of air passing through the idle speed control valve can be calculated by a method explained later. Therefore, it is possible to determine that the idle speed control has failed when the difference between the actual amount of air passing through the idle speed control valve and the amount of the air calculated from the degree of opening of the idle speed control valve (i.e., the duty ratios of the drive signals) is larger than a predetermined value. If the failure of the idle speed control is detected by this method, the mechanical failure, such as sticking of the valve body, as well as the failure in the electric circuits can be detected.

In the routine in FIG. 5, if it is determined that the idle speed control is normal, the routine proceeds to step 507 in which the ECU 10 performs a normal ignition timing control. Namely, at step 507, the value of ACAL which is determined at step 503 is compared with the value of the last ignition timing setting $AOP_{i-1}$ which is the value of the actual ignition timing when the routine was last performed. If the ignition timing ACAL advances more than a predetermined amount β from the last ignition timing $AOP_{i-1}$, i.e., if the value ACAL is less than $AOP_{i-1}+\beta$ at step 507, the actual ignition timing AOP is set at $AOP_{i-1}+\beta$ at step 509. The value β is a positive constant, and since the ignition timings ACAL and AOP are expressed by crank angles before the top dead centers (BTDC) of the respective cylinders, $AOP_{i-1}+\beta$ represents an ignition timing which advances by β from the ignition timing $AOP_{i-1}$. If the calculated value ACAL does not advance more than β from the last ignition timing $AOP_{i-1}$ (this includes the case that the value ACAL is retarded from $AOP_{i-1}$), the actual ignition timing AOP is set at the calculated value ACAL at step 523. Then the new value of AOP determined at steps 509 or 523 is stored in the RAM 105.

When the new value of AOP is stored in the RAM 105, the ECU 10 outputs ignition signals to the ignition circuit 112 at the crank angles AOP before the TDC of the respective cylinders and thereby fires the ignition plug of the corresponding cylinder.

After the steps 507, 509 and 523, the amount of the ignition timing per one execution of the routine is restricted to the maximum value β in the normal operation (i.e., when the failure of the idle speed control does not occur). The reason why the amount of the ignition timing advance per one execution of the routine (i.e., the ignition timing advancing rate) is restricted is that, since the engine output torque is increased by the ignition timing advance, if the ignition timing advancing rate is high, engine knock or a sudden increase in the engine output torque occurs.

If it is determined that the idle speed control has failed at step 505, the ignition timing retarding operation is performed in accordance with the amount of engine inlet air at steps 511 through 525. Namely, at step 511, the minimum allowable inlet air amount $Q_L$ for ignition timing retarding operation is determined in accordance with the coolant temperature THW. Then at step 513, the present inlet air amount Q is compared with the minimum allowable inlet air amount $Q_L$. If the present inlet air amount Q is less than the minimum allowable value $Q_L$, the routine proceeds to step 507 and, thereby, the ignition timing control in the normal operation is performed. In this case, the ignition timing retarding operation is not performed even if the idle speed control has failed.

If $Q_L \leq Q$ at step 513, the routine proceeds to step 515 which determines the limit value ACALF of the ignition timing retarding. The value ACALF is determined in accordance with the inlet air amount Q as explained later. Then, the value of the base ignition timing ACAL (calculated at step 503) and the limit value ACALF are compared at step 517.

At step 517, if ACALF<ACAL, i.e., if ACAL advances from ACALF, the value of ACAL is replaced by the value ACALF at step 519, and steps 521 through 525 are executed using the replaced value of ACAL. In this case, the ignition timing AOP is retarded from the base ignition timing calculated at step 503.

At steps 521 and 525, operations similar to those in steps 507 and 509 are performed in order to restrict the ignition timing advancing rate by a predetermined value α. However, the value α (the maximum ignition timing advancing rate when the idle speed control fails) is set smaller than the value β (the maximum ignition timing advancing rate in the normal operation), i.e., $0 < \alpha < \beta$.

The reasons why the minimum allowable inlet air amount $Q_L$ must be introduced and why the value of the rate α is set smaller than the value of the rate β will be explained later.

If ACALF>ACAL at step 517, i.e., if the base ignition timing ACAL is retarded from the limit value ACALF, the routine proceeds to step 507 since further ignition timing retarding is not required in this case. In this case, the steps 507, 509 and 523 are executed using the base ignition timing determined at step 503. After the steps 517 through 525, the ignition timing when the idle speed control has failed is always set at, or retarded from, the limit value ACALF.

Figure 7:
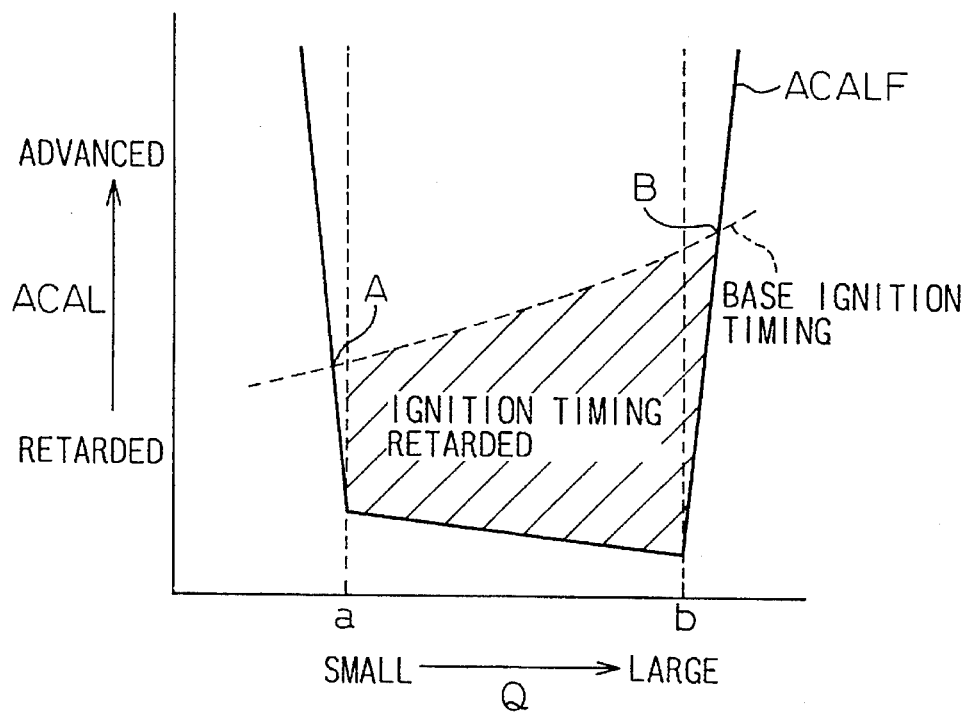
FIGS. 7 and 8 show examples of the settings of constants used in the flowchart in FIG. 5.

FIG. 7 shows a relationship between the limit value ACALF set at step 515 and the inlet air amount Q. As shown in FIG. 7, the limit value ACALF rapidly increases (i.e., ACALF is advanced) when the inlet air amount Q is larger than a predetermined first value b and when Q is less than a predetermined second value a. Further, when Q is between the values a and b, the limit value ACALF is set at a small value (i.e., retarded from the ignition timing in the normal operation) which slightly decreases as the inlet air amount Q increases. The dotted line in FIG. 7 shows an example of the value of the base ignition timing ACAL when the engine speed N is constant. The base ignition timing ACAL becomes more advanced as the inlet air amount Q increases. Therefore, when the inlet air amount Q becomes substantially larger than the predetermined first value b, and Q becomes substantially smaller than the predetermined second value a (points B and A in FIG. 7), the base ignition timing ACAL becomes smaller than (i.e., is retarded from) the limit value ACALF, and when the inlet air amount Q is between the values a and b, the base ignition timing ACAL becomes larger than (i.e., advances from) the limit value ACALF.

By setting the limit value as shown in FIG. 7, when the inlet air amount Q is larger than point B or smaller than point A in FIG. 7, the value of the base ignition timing determined at step 503 is used at steps 521 through 525 and the ignition timing retarding is not actually performed. Namely, the ignition timing retarding is performed only when the inlet air amount Q is between A and B in FIG. 7, since the value of ACAL is replaced by the value of ACALF at step 509 in this region.

The predetermined first value b of the inlet air amount Q is, for example, set at a larger value (for example, by 20%) than the inlet air amount when the idle speed control valve is fully opened. This value b corresponds to the inlet air amount when the engine is accelerated slowly from the idle condition. The predetermined second value a is set at near the inlet air amount when the idle speed control valve is fully closed during the idle operation of the engine.

The reason why the ignition timing retarding is not performed when the inlet air amount Q is substantially larger than the predetermined first value b is that, since it is considered that the driver of the vehicle requires a certain amount of engine output in this operating condition, the drivability is negatively affected due to the reduction of the engine output torque if the ignition timing is retarded. Further, since the engine output becomes relatively large in this operating condition, the exhaust gas temperature may excessively increase if the ignition timing is retarded.

The reason why the ignition timing retarding is not performed when the inlet air amount Q is substantially smaller than the predetermined second value a is that, since the engine operation is not stable in this region due to low idle speed, and instability of the engine operation may increases, or in some cases, an engine stall may occur if the ignition timing is retarded. Further, by prohibiting the ignition timing retarding operation when the inlet air amount is low, the ignition timing is not retarded if the idle speed control valve is locked at fully closed position by the failure of the idle speed control.

As explained above, the ignition timing retarding operation is not performed even if the idle speed control has failed if the engine load conditions are such that engine output is required (Q>b) or there is a possibility of an engine stall (Q<a).

Figure 8:
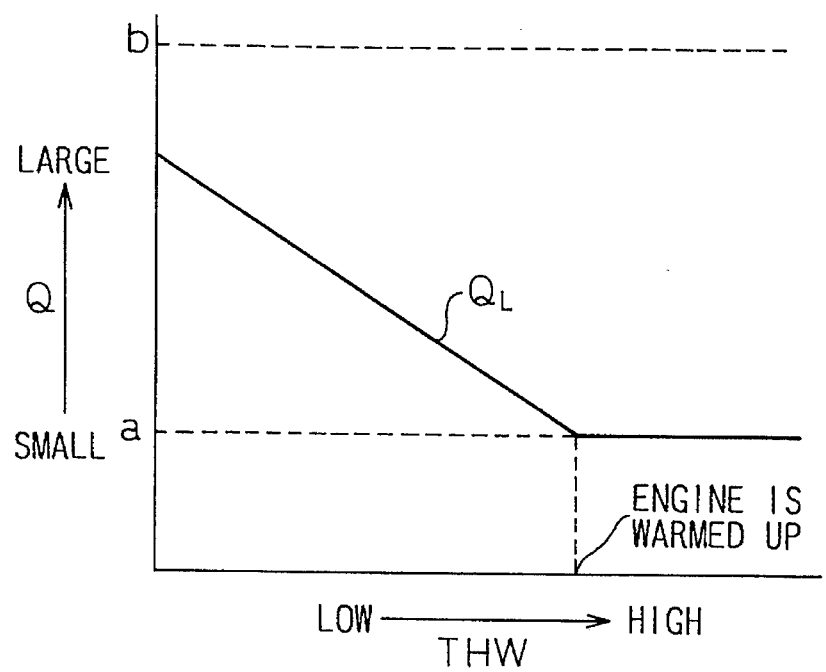

Next, the minimum allowable inlet air amount $Q_L$ is explained. The value of $Q_L$ is determined in accordance with the coolant temperature THW, and if the inlet air amount Q is smaller than $Q_L$, the ignition timing retarding operation is not performed even if the idle speed control has failed (step 513). FIG. 8 shows the relationship between the coolant temperature THW and the minimum allowable inlet air amount $Q_L$. As seen from FIG. 8, the value of $Q_L$ is set to a large value when the coolant temperature THW is low, and the value of $Q_L$ decreases as the temperature THW increases. After the engine is warmed up, i.e., after THW reaches a predetermined temperature (for example, 80° C.), the value of $Q_L$ is set at the same as the predetermined second value a in FIG. 7.

When the engine temperature (i.e., the coolant temperature THW) is low, the friction loss in the engine increases due to the increase in the viscosity of the lubricant of the engine. Therefore if the ignition timing retarding is performed when the inlet air amount Q is smaller than $Q_L$, an instability of the idle operation or an engine stall may occur. In this embodiment, by prohibiting the ignition timing retarding operation when the engine is operated in the region where the inlet air amount Q is smaller than $Q_L$, the instability of the engine operation and the engine stall are prevented. The actual value of $Q_L$ is determined in such a manner that over-running of the engine does not occur with a consideration of the increase in the friction loss of the engine.

Next, the reason for the difference between the limiting values of the ignition timing advancing rates α and β in steps 507 and 521 is explained. As explained before, the maximum ignition timing advancing rate is restricted in the normal operation by the limiting value β to prevent the sudden increase of the engine output torque and the engine knock. Since the ignition timing is adjusted in accordance with the inlet air amount (FIG. 7), in this embodiment, when the idle speed control has failed, the ignition timing is advanced in accordance with the inlet air amount even in the ignition timing retarding operation. Therefore, it is necessary to restrict the ignition timing advancing rate for the same reason even during the ignition timing retarding operation. However, if the limiting value for the ignition timing advancing rate during the ignition timing retarding operation is set at the same as in the normal operation, problems may arise. These problems are explained with reference to FIG. 9.

Figure 9:
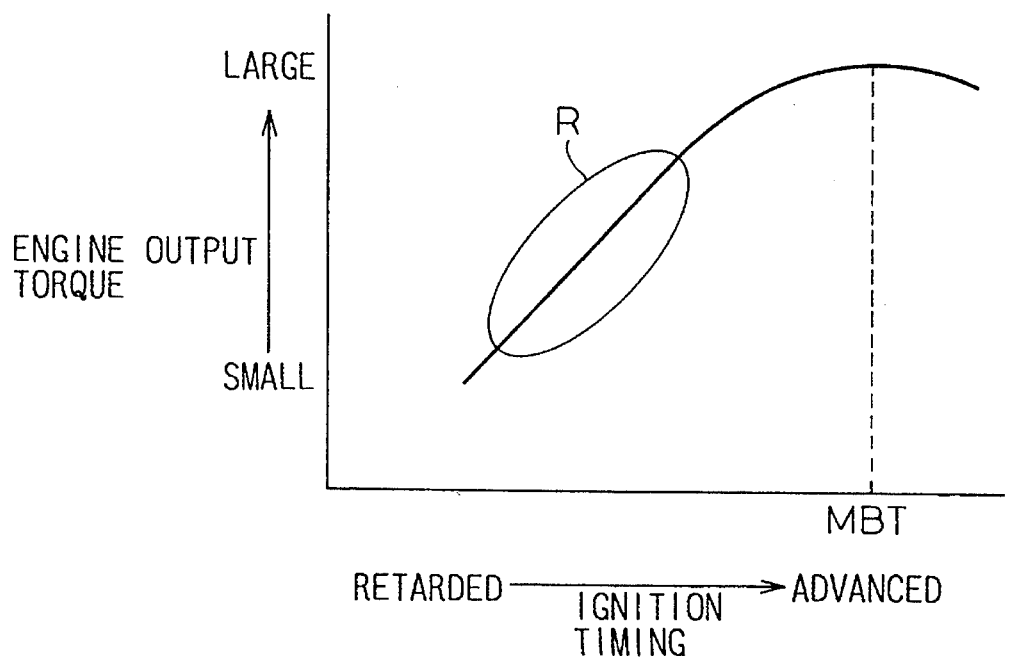
FIG. 9 is a graph showing the change in the output torque according to the ignition timing.

FIG. 9 shows a typical change in the engine output torque when the ignition timing is changed while keeping other operating conditions constant. Generally, the engine output torque increases as the ignition timing advances, and reaches a maximum at the maximum torque ignition timing (shown by MBT in FIG. 9). Near the MBT, the output torque curve becomes nearly horizontal. Namely, when the ignition timing approaches the MBT, the sensitivity of the engine output torque to the change in the ignition timing is low. On the other hand, when the ignition timing is retarded from the MBT, the torque curve becomes steep, i.e., the sensitivity of the engine output torque to the change in the ignition timing is high. Usually, the ignition timing in the normal operation of the engine is set near the MBT. Therefore, in the normal operation, the limiting value β for the ignition timing advancing can be set at relatively large value since the sensitivity of the engine torque to the change in the ignition timing is relatively low and a sudden torque increase does not occur even if the ignition timing is advanced at a relatively high rate. However, when the engine is operated with retarded ignition timing, such as during an idle speed control failure, the ignition timing is controlled near the region designated by R in FIG. 9. In this region, since the sensitivity of the engine output torque to the change in the ignition timing is relatively high, if the ignition timing is advanced at the same rate as in the region near the MBT, a sudden increase in the engine output torque may occur. Therefore, the ignition timing advancing rate during the ignition timing retarding operation is restricted to a smaller value than in the normal operation of the engine, i.e., the limiting value α is set at smaller value than β in this embodiment to, thereby prevent sudden increase in engine torque and engine knock during the ignition timing retarding operation.

Next, another embodiment is explained with reference to FIG. 10. In the above embodiment, the ignition timing is controlled essentially by the limit value ACALF when the idle speed control fails. Further, the limit value is determined based on only the inlet air amount Q. However, the inlet air amount does not always strictly represent the engine load conditions. For example, the optimum amount of the ignition timing retarding in the idle speed control failure varies when the engine temperature or the load conditions of the engine auxiliary equipment, such as a compressor for an air conditioner, change. Therefore, it is preferable to determine the ignition timing taking these factors into consideration even when the idle speed control has failed. In the embodiment in FIG. 10, the amount of the ignition timing retarding, i.e., the value of ACALF in FIG. 5 is corrected in accordance with the engine temperature and the load conditions of the engine auxiliary equipment.

Figure 10:
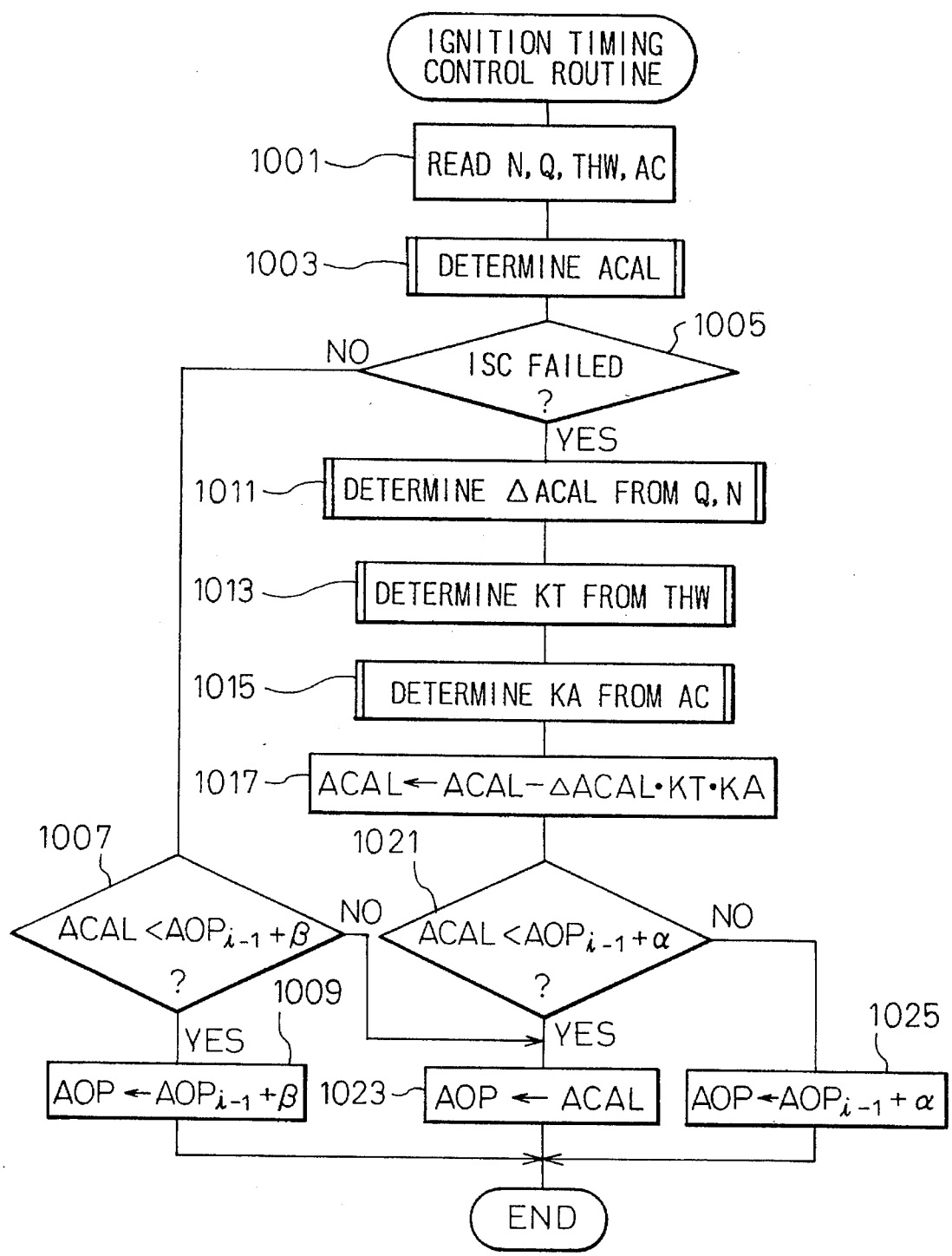
FIG. 10 is a flowchart explaining another embodiment of the ignition timing control according to the present invention.

FIG. 10 shows a flowchart explaining the ignition timing control of the present embodiment. This routine is performed by the ECU 10 at predetermined intervals, or at predetermined crank angles.

When the routine starts in FIG. 10, at step 1001, the engine speed data N, inlet air amount data Q, and the engine coolant temperature data THW are read from the RAM 105. Further, in this embodiment, an air conditioner load signal AC which represents whether the air conditioner is ON or OFF is input from the air conditioner switch 114 in FIG. 1. At steps 1003 the base ignition timing ACAL is determined from the engine speed N and the inlet air amount Q, and at step 1005, it is determined whether the idle speed control has failed. The operations in steps 1003 and 1005 are the same as those in steps 503 and 505 in FIG. 5, respectively. If it is determined that the idle speed control is normal at step 1005, the ignition timing control in the normal operation is performed at steps 1007, 1009 and 1023. The operations at steps 1007, 1009 and 1023 are the same as those at steps 507, 509 and 523, respectively.

Figure 11:
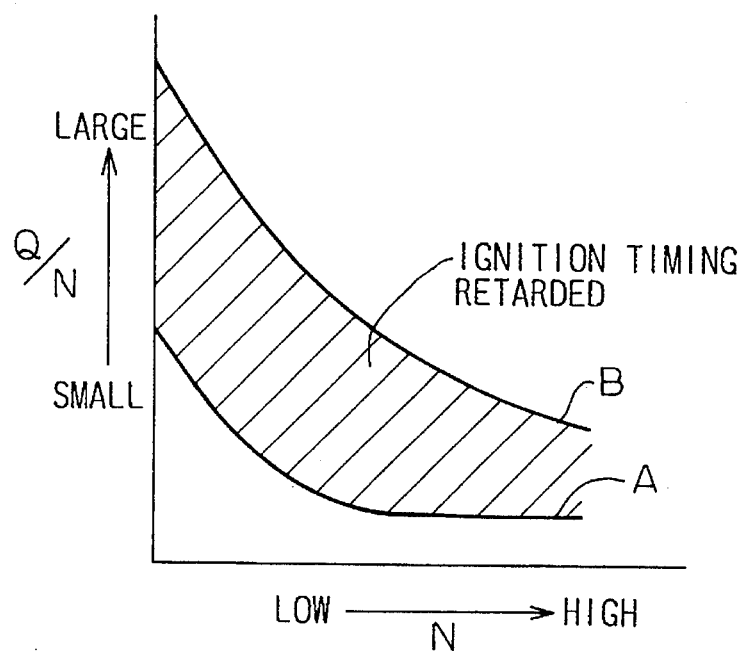
FIGS. 11, 12 and 13 are graphs showing the settings of constants used in the ignition timing control in FIG. 10.

If it is determined, at step 1005, that the idle speed control has failed, the amount of ignition timing retarding ΔACAL is determined. As explained later, the ignition timing when the idle speed control fails is determined in this embodiment by adding the amount ΔACAL to the base ignition timing ACAL determined at step 1003. The amount of ignition timing retarding ΔACAL is also determined in accordance with the engine load (the amount of inlet air per one revolution of the crankshaft, Q/N) and engine speed N using a numerical table in the form similar to the table used for determining the base ignition timing ACAL. FIG. 11 shows the engine operating condition in which the ignition timing retarding operation is performed upon the failure of the idle speed control. In FIG. 11, a hatched area between the curves A and B indicates the engine operating region where the ignition timing is retarded when the idle speed control fails. In other words, when the engine is not operated in the hatched region, the amount of ignition timing retarding ΔACAL is set to be 0 in this embodiment.

Figure 12:
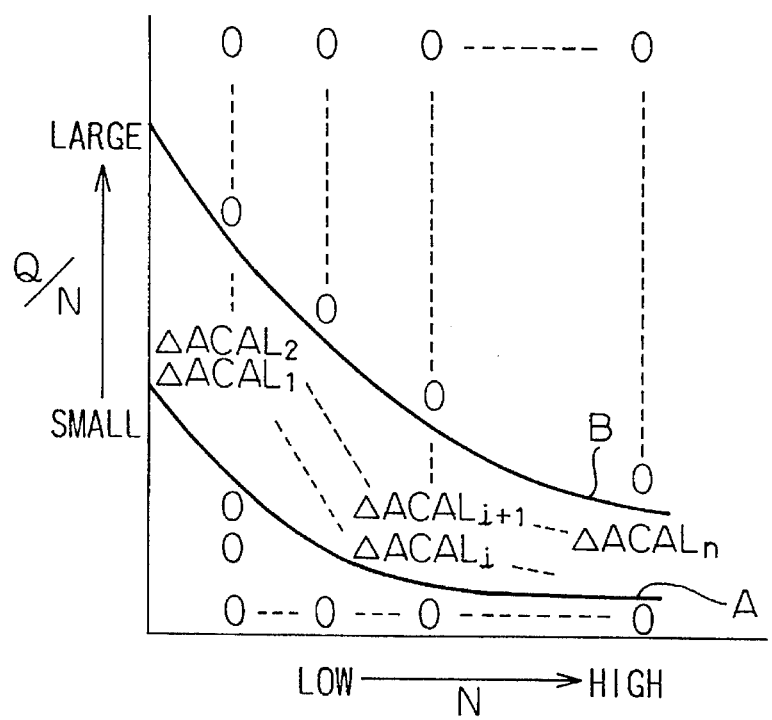

In FIG. 11, the vertical axis designates the engine load (i.e., Q/N) and the horizontal axis designates the engine speed N. The curves A and B designate constant inlet air amount line, i.e., the curve A and B show the changes in Q/N and N when the inlet air amount is maintained constant. The curve A shows a constant inlet air amount line when Q is maintained at Q=a (the value of a is the same as the predetermined second value a in FIG. 7), and curve B shows the same when Q is maintained at Q=b (the value of b is the same as the predetermined first value b in FIG. 7). Namely, in this embodiment, the ignition timing retarding operation is also performed only when the inlet air amount Q is between the predetermined first value b and the predetermined second value a. Further, in this embodiment, when the ignition timing retarding operation is carried out in the hatched region in FIG. 11, the amount of the ignition timing retarding ΔACAL is determined in accordance with the engine load conditions. FIG. 12 shows an example of the numerical table used for determining ΔACAL. This table is stored in the ROM 104 of the ECU 10. The curves A and B are the same constant inlet air amount lines as those in FIG. 11. As shown in FIG. 12. The value of ΔACAL is set to be 0 when the Q/N and N falls outside of the region determined by the curves A and B.

Figure 13:
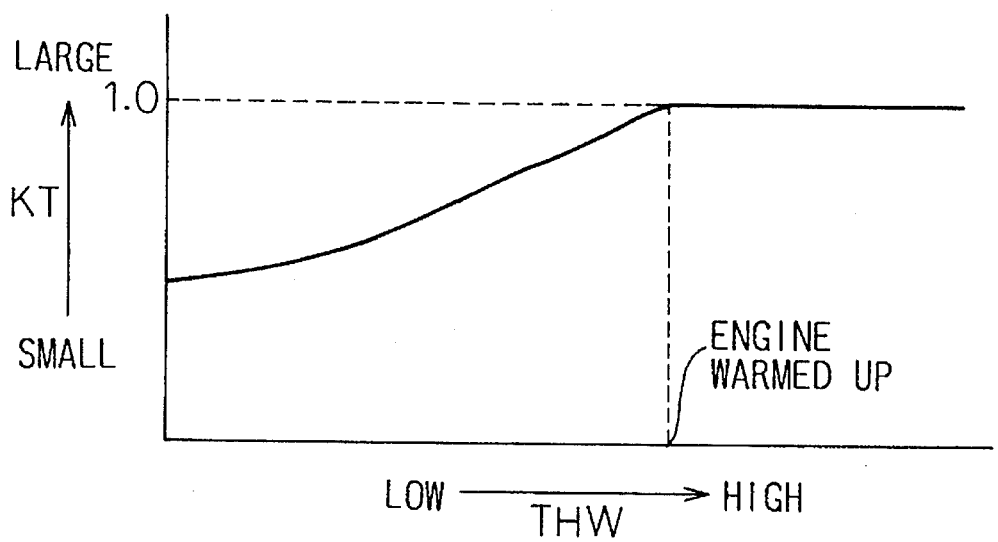

In FIG. 10, after the ΔACAL is determined in the manner explained above, a temperature correction factor KT is determined at step 1013. The temperature correction factor KT is determined in accordance with the engine coolant temperature THW based on the relationship shown in FIG. 13. As shown in FIG. 13, the correction factor KT is set smaller as the engine coolant temperature THW becomes lower since the engine friction loss increases as the engine temperature THW becomes lower. The correction factor KT is set to be 1.0 after the engine is fully warmed up (for example, when the engine coolant temperature becomes higher than 80° C.).

Further, in FIG. 10, at step 1013, an auxiliary load conditions correction factor KA is determined. The auxiliary load conditions correction factor KA is determined in accordance with whether the air conditioner load signal AC is ON or OFF, i.e., when the signal AC is ON, the correction factor KA is set at a positive constant value less than 1.0, and when the signal AC is OFF, the correction factor KA is set at 1.0. The reason why the correction factor KA is set at smaller value when the air conditioner signal AC is ON is that, when the air conditioner is ON, since the engine auxiliary load is increased, it is necessary to reduce the amount of ignition timing retarding to prevent a decrease in the engine output.

At step 1017 the base ignition timing ACAL is corrected by the temperature correction factor KT and the auxiliary load conditions correction factor KA by $$ACAL=ACAL-\Delta ACAL \times KT \times KA$$

Thus, the corrected value of ACAL becomes the optimum ignition timing which corresponds to the engine warming up conditions and auxiliary load conditions.

After calculating the corrected value of ACAL, the actual ignition timing AOP is set at steps 1021, 1023 and 1025. The operations at steps 1021, 1023 and 1025 are the same as the operations at steps 521, 523 and 525.

By this routine, the ignition timing is retarded when the idle speed control fails, in accordance with the engine load conditions such as warming up conditions of the engine and auxiliary load conditions of the engine as well as the inlet air amount.

Figure 14:
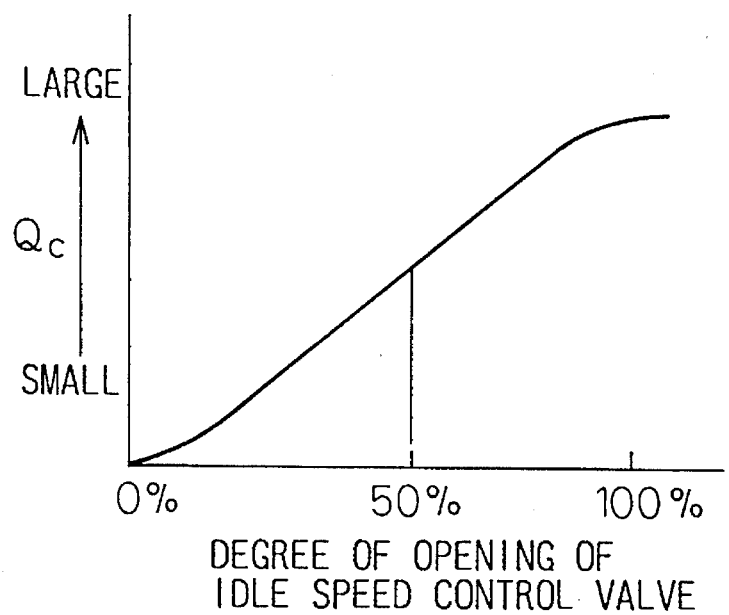
FIG. 14 is a graph showing typical flow characteristics of the idle speed control valve.
Figure 15:
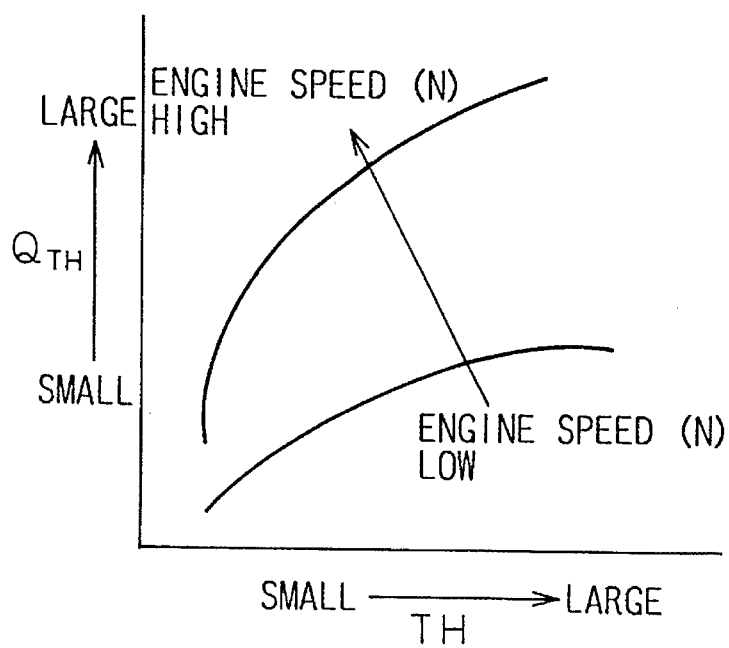
FIG. 15 is a graph showing typical flow characteristics of the throttle valve.

Another embodiment of the present invention is now explained with reference to FIGS. 14 through 16. In the embodiment in FIG. 10, the amount of the ignition timing retarding is determined by engine load conditions. However, in the actual engine operation, it is preferable to determine the amount of the ignition timing retarding ΔACAL based on the magnitude of the influence on the engine operation exerted by the failure of the idle speed control. For example, when the inlet air amount of the engine is large, the increase of the inlet air amount caused by the idle speed control failure is very small compared with the total inlet air amount of the engine, thus the influence exerted by the idle speed control failure on the engine operation becomes negligible. Therefore, it is not necessary to retard ignition timing in this case even if the failure of the idle speed control occurs. On the contrary, if the inlet air amount of the engine is small, the influence of the idle speed control failure on the engine operation becomes large. Therefore, the ignition timing retarding operation is required in this case to prevent over-running of the engine.

In this embodiment, the magnitude of the influence of the idle speed control failure on the engine operation is determined by a parameter FP which is defined by a ratio of the increase in the inlet air amount caused by the idle speed control failure to the total amount of inlet air, and the amount of ignition timing retarding ΔACAL is determined in accordance with the value of the parameter FP.

In this embodiment, since only the determination of ΔACAL is different from the embodiment in FIG. 10, flowchart of the control routine is the same as FIG. 10, with only the exception that, at step 1011, ΔACAL is determined in the manner explained hereinafter. Therefore, the flowchart of the ignition timing control of this embodiment is not presented.

In this embodiment, the amount of the ignition timing retarding ΔACAL (FIG. 10, step 1011) is determined by the value of the parameter FP representing the magnitude of the influence of the idle speed control failure on the engine operation. The parameter FP is defined by the following formula.

$$FP = Q_{FAIL}/Q_{TOTAL} = (Q_{ISC} - Q_C)/Q_{TOTAL}$$

In the above formula, $Q_{ISC}$ is the amount of inlet air supplied to the engine through the idle speed control valve 22 (the bypass air amount) when a failure of the idle speed control occurs, and $Q_C$ is the bypass air amount when the idle speed control is normal.

Therefore, $Q_{FAIL} = (Q_{ISC} - Q_C)$ represents the increase in the amount of the inlet air caused by the idle speed control failure. $Q_{TOTAL}$ is the inlet air amount detected by the air-flow meter 3, i.e., total amount of the inlet air supplied to the engine.

$Q_{FAIL} = (Q_{ISC} - Q_C)$ is calculated in the following manner. The bypass air amount in the normal condition $Q_C$ is determined by the degree of opening of the idle speed control valve 22, i.e., the duty ratio of the drive signal of the idle speed control valve 22. For example, the bypass air amount in the normal operation $Q_C$ is a function of the degree of opening of the idle speed control valve as shown in FIG. 14. Further, $Q_{ISC}$ is given by the following formula.

$$Q_{ISC} = Q_{TOTAL} - Q_{TH}$$

Namely, $Q_{ISC}$ equals the total inlet air amount reduced by the amount of inlet air $Q_{TH}$ passing through the throttle valve 16. The amount of inlet air $Q_{TH}$ passing through the throttle valve 16 is determined by the engine speed N and the degree of opening TH of the throttle valve 16. FIG. 15 shows an example of the relationships between $Q_{TH}$, $Q_{TH}$ and N. In this embodiment, the value of $Q_{TH}$ is previously measured with various engine speeds N and degree of openings TH of the throttle valve 16 using an actual engine, and the values of $Q_{TH}$ are stored in the ROM 104 of ECU 10 in the form of a numerical table based on N and TH. Therefore, the value of $Q_{TH}$ can be determined by the degree of opening TH detected by the throttle opening sensor 17 and the engine speed N using this numerical table. The value of $Q_{ISC}$ is then calculated by $Q_{ISC} = Q_{TOTAL} - Q_{TH}$ using the total amount of the inlet air $Q_{TOTAL}$ detected by the air-flow meter 3, and the value of $Q_{FAIL}$ is calculated by $Q_{FAIL} = Q_{ISC} - Q_C$. Thus, the value of the parameter FP is calculated by $FP = Q_{FAIL}/Q_{TOTAL}$ using the $Q_{FAIL}$ calculated by the above procedure and the $Q_{TOTAL}$ detected by the air-flow meter 3.

Figure 16:
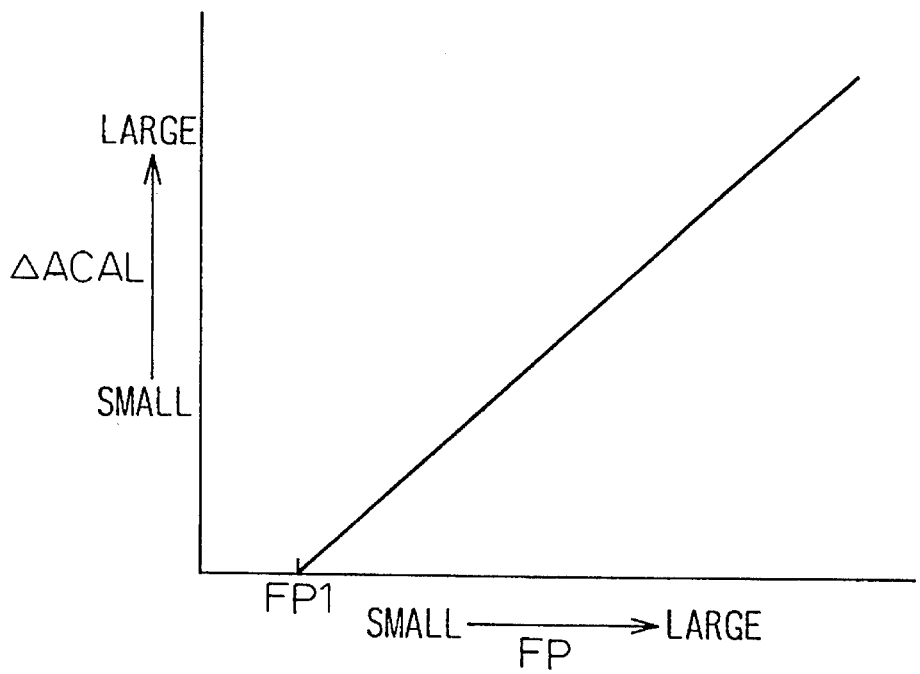
FIG. 16 is a graph showing the setting of a constant used in another embodiment of the ignition timing control according to the present invention.

The amount of the ignition timing retarding ΔACAL is determined in accordance with the value of the parameter FP using the relationship in FIG. 16. As seen from FIG. 16, the amount of the ignition timing retarding ΔACAL is set at 0 when the value of the parameter FP is less than or equal to a predetermined value FP1, and increases in proportion to the value of FP in the region FP>FP1. When the value of the FP is less than or equal to FP1, the influence of the increase in the inlet air amount due to the failure of the idle speed control on the actual engine operation is very small. Therefore, the ignition timing retarding is not performed in the region FP≦FP1. The reason why the value of ΔACAL is increased in proportion to the value of FP in the region FP>FP1 is that, since the engine output torque increases in proportion to the amount of the inlet air, the parameter $FP = Q_{FAIL}/Q_{TOTAL}$ represents also the ratio of increase in the engine output torque caused by the idle speed control failure to the engine total output torque. Further, as shown in FIG. 9, when the ignition timing is retarded from MBT, the engine output torque decreases nearly in proportion to the amount of ignition timing retardation. Therefore, by increasing the ΔACAL in proportion to FP in the region FP>FP1, the increase of the engine torque caused by a failure of the idle speed control can be canceled by a decrease in the engine torque caused by the ignition timing retardation. Therefore, in this embodiment, the increase in the engine torque due to a failure of the idle speed control can be effectively suppressed by retarding the ignition timing in accordance with the magnitude of the influence of an idle speed control failure on the actual engine operation.

Next, another method for determining the amount of the ignition timing retarding ΔACAL in FIG. 10, step 1011 is explained. In this embodiment, the value of ΔACAL which is determined in accordance with the value of the parameter FP is further corrected by the increasing rate of $Q_{TOTAL}$ (i.e., the amount of the increase in the inlet air due to the failure of the idle speed control). In the above embodiment, the value of ΔACAL is determined by the value of FP regardless of the transient condition after a failure of the idle speed control occurs. However, even if $Q_{FAIL}$ finally reaches the same value after the idle speed control fails, if $Q_{FAIL}$ increases suddenly, the influence exerted on the actual engine operation is larger than the influence when $Q_{FAIL}$ increases gradually. Therefore, it is necessary to set the amount of the ignition timing retarding ΔACAL at larger value when the increasing rate of $Q_{FAIL}$ after the failure of idle speed control is large.

Figure 17:
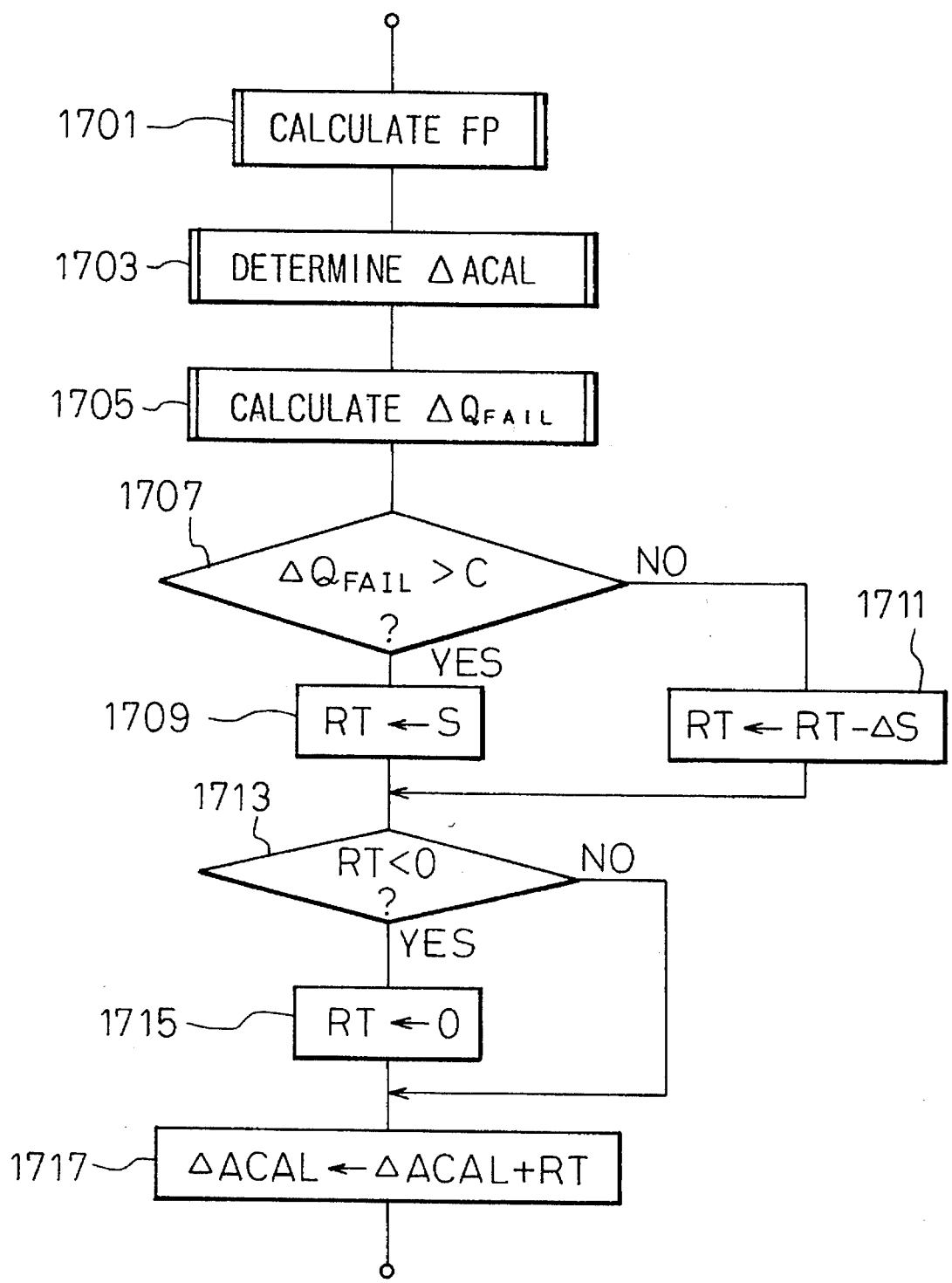
FIG. 17 is a flowchart explaining another embodiment of the ignition timing control according to the present invention.

FIG. 17 is a flowchart showing the steps for correcting ΔACAL using the increasing rate of $Q_{FAIL}$.

These steps are executed in the routine in FIG. 10 instead of step 1011. By executing the steps in FIG. 17, the value of ΔACAL is corrected in accordance with the increasing rate of $Q_{FAIL}$ immediately after the idle speed control fails, and after the abrupt increase in $Q_{FAIL}$ has stopped, i.e., when the value of $Q_{FAIL}$ becomes stable, the value of ΔACAL is gradually decreased until it reaches the value corresponding to the value of FP.

Step 1701 in FIG. 10 is executed when it is determined that the idle speed control has failed at step 1005 in FIG. 10. At step 1701, the value of the parameter FP is calculated in the manner explained above. At step 1703 then, ΔACAL is determined in accordance with the relationship in FIG. 16.

At step 1703, the increasing rate $\Delta Q_{FAIL}$ is calculated by $\Delta Q_{FAIL} = Q_{FAIL} - (Q_{FAIL, i-1})$.

In the above formula, $(Q_{FAIL, i-1})$ represents the value of $Q_{FAIL}$ when the routine is last performed.

At step 1707, the calculated increasing rate $\Delta Q_{FAIL}$ is compared with a predetermined value C, and if $\Delta Q_{FAIL} > C$, the routine proceeds to step 1709 which sets the correction amount RT for the ΔACAL at a predetermined positive constant value S. If $\Delta Q_{FAIL} \geq C$, the routine proceeds to step 1711 which reduce the present value of the correction amount RT by ΔS. After the value of the correction amount RT is determined at steps 1709 or 1711, the value of RT is restricted by the minimum value 0, i.e., if the value of RT becomes negative, the value of RT is set to be 0 at steps 1713 and 1715. Then at step 1717, the ΔACAL determined at step 1703 is further increased by the correction amount RT.

By executing steps 1707 through 1717, when the inlet air amount increases abruptly due to a failure of the idle speed control, i.e., when the increasing rate $\Delta Q_{FAIL}$ is larger than a predetermined value C, the amount of the ignition timing retarding $\Delta ACAL$ is increased (ignition timing is further retarded) by the predetermined amount S (steps 1709 and 1717). When the abrupt increase in the amount of inlet air stops, i.e., when the increasing rate $\Delta Q_{FAIL}$ becomes small, the correction amount RT is reduced by $\Delta S$ per every execution of the routine (step 1711). Therefore, the ignition timing gradually advances until the correction amount RT becomes 0 and the value of $\Delta ACAL$ becomes the same as that determined at step 1703. Therefore, according to the embodiment in FIG. 17, the increase in the engine output torque can be effectively suppressed even in the transient condition following the failure of the idle speed control.

Figure 18:
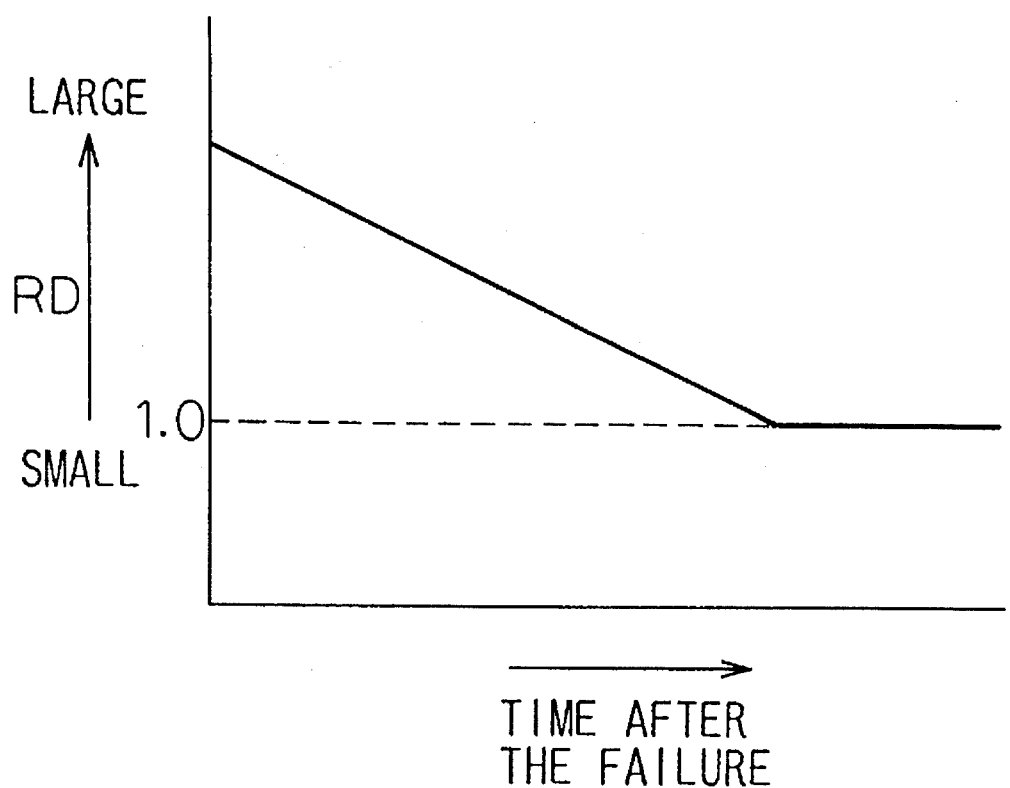
FIG. 18 is a graph showing the setting of a constant used in another embodiment of the ignition timing control according to the present invention.

Even though, in the embodiment in FIG. 17, the amount of the ignition timing retarding $\Delta ACAL$ is increased only when the increasing rate of the inlet air amount is large, there are cases in which the drivability of the vehicle is worsened even if the increasing rate of the inlet air amount is relatively low. For example, when the vehicle travels at slow speed, even a slight increase in the engine output torque can cause the worsening of the drivability. Thus, even if the increasing rate of the inlet air amount is small, worsening of the drivability may occur in this case. In order to prevent this problem from occurring, the amount of the ignition timing retarding $\Delta ACAL$ may be increased temporarily following the failure of the idle speed control. In this case, the value of $\Delta ACAL$ is gradually decreased until $\Delta ACAL$ reaches the value determined by the parameter FP. Namely, when a failure of the idle speed control occurs, the value of $\Delta ACAL$ determined by the parameter FP is corrected by $\Delta ACAL = \Delta ACAL \times RD$ using a correction factor RD ($RD \geq 1.0$). Then the value of the correction factor RD is gradually reduced as time lapses until the value of RD becomes 1.0, as shown in FIG. 18. Further the value of the correction factor RD may be reduced only when the throttle valve is fully closed (the time count may proceed only when the throttle valve is fully closed, i.e., the vehicle is stopped), since the reduction of the value of RD causes an increase in the engine output torque, and this may negatively affect the drivability if the vehicle is moving.

Now, another embodiment of the present invention will be explained with reference to FIGS. 19 and 20. In the embodiments explained above, the ignition timing is retarded when the idle speed control valve 22 is locked at its fully opened position. However, when the idle speed control fails, it is also possible that the degree of opening of the idle speed control valve decreases. For example, when the supply of the electric current to the solenoid 323 in FIG. 3 stops due to a disconnection of the line, or when the electric current supplied to the solenoid 325 cannot be stopped due to short-circuiting, the degree of opening of the idle speed control valve decreases due to the failure. In this case, the engine output torque decreases since the inlet air amount decreases. Therefore, if the ignition timing retarding operation is performed in this condition, an instability of the engine idle operation, or an engine stall, may occur.

In this embodiment, when the failure of the idle speed control occurs, the ECU 10 determines that whether the failure of the idle speed control decreases the amount of bypass air. If it is determined that the failure of the idle speed control decreases the amount of bypass air, the ECU 10 prohibits the ignition timing retarding operation in order to prevent the instability of the idle operation and the engine stall from occurring.

Figure 19:
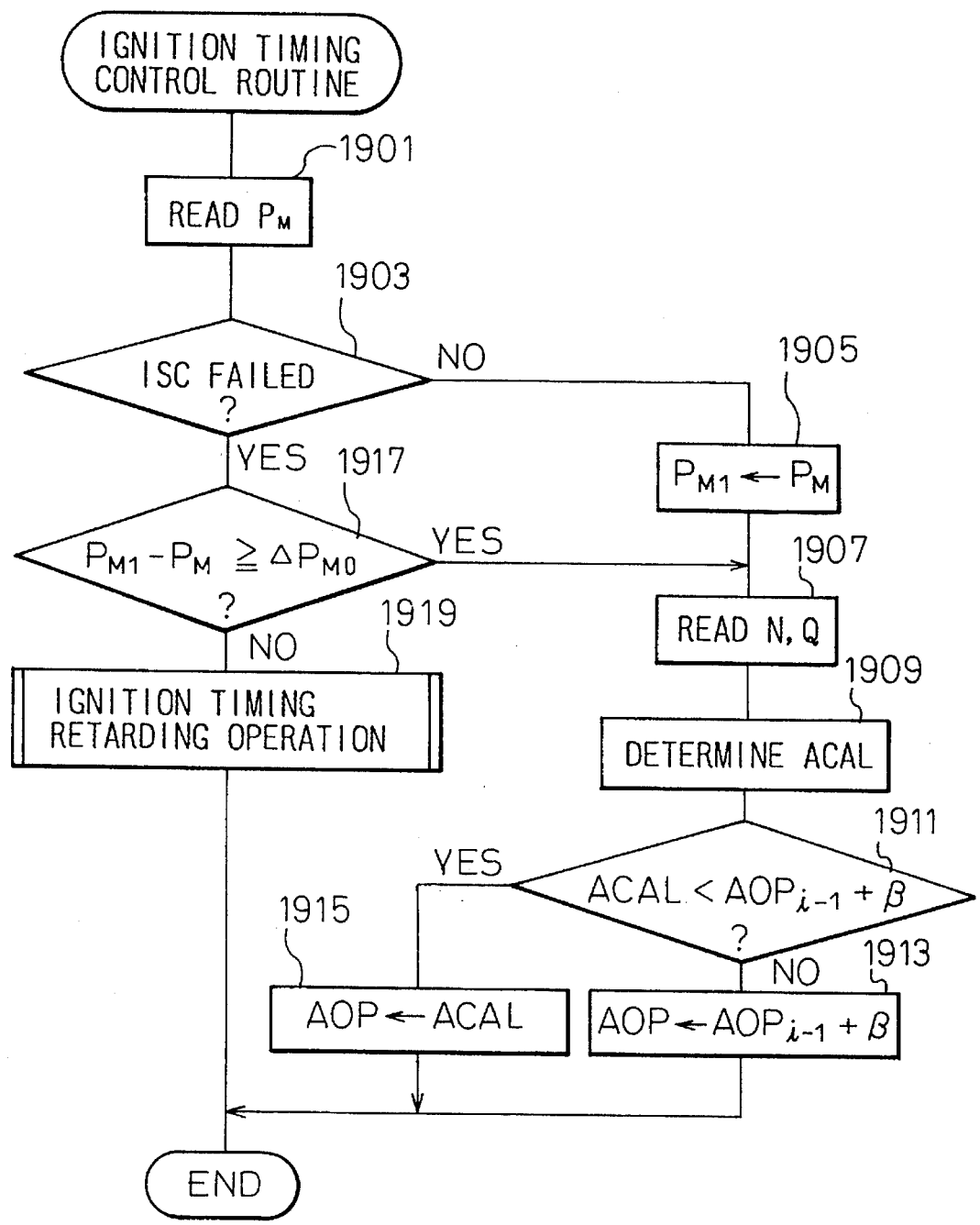
FIG. 19 is a flowchart explaining another embodiment of the ignition timing control according to the present invention.
Figure 20:
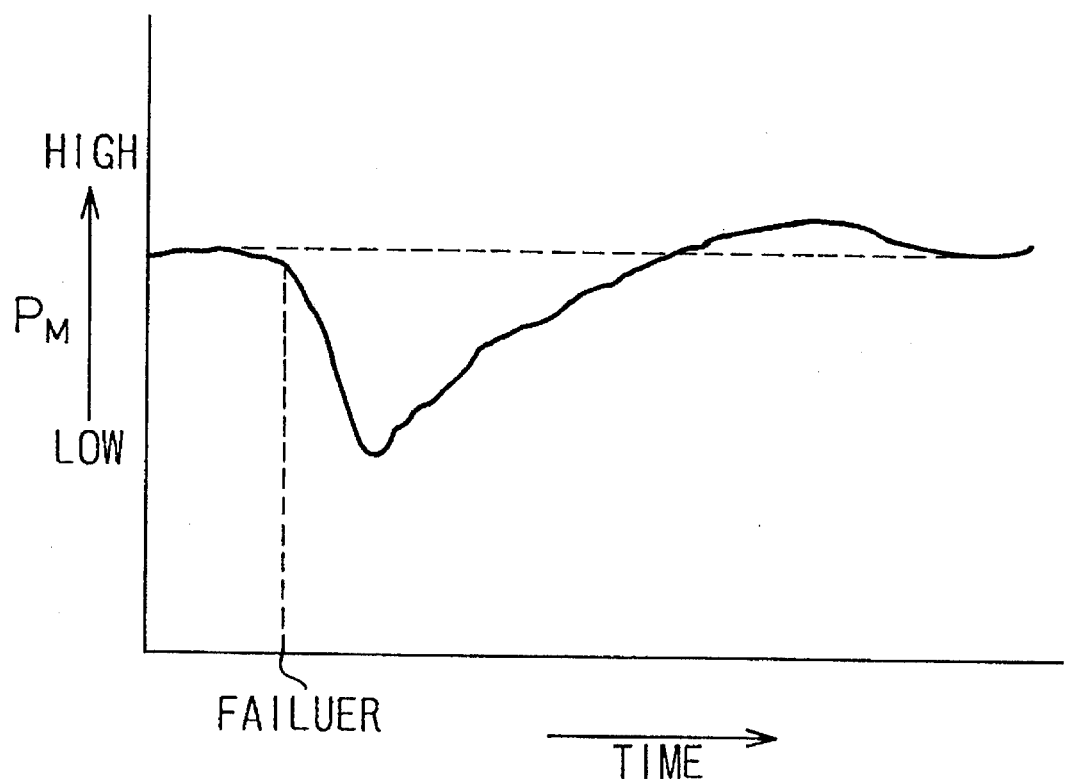
FIG. 20 is a diagram explaining a method of determining whether the failure of the idle speed control device has caused a decrease in the amount of air passing through the inlet air bypass passage.

FIG. 19 shows the flowchart explaining the ignition timing control according to the present embodiment. This routine is performed by the ECU 10 at predetermined intervals, or at predetermined crank angles.

When the routine starts in FIG. 19, at step 1901, the inlet air pressure $P_M$ is read from the RAM 105. In this embodiment, an inlet air pressure sensor 13, which generates an analog voltage signal in response to the absolute pressure in a surge tank 12 on the inlet air passage 2 is provided (refer to FIG. 1), and the signal from the inlet air pressure sensor 13 is fed to the A/D converter 101. The inlet air pressure data $P_M$ is fetched by an A/D conversion routine at regular intervals, and the latest value of $P_M$ is stored in a predetermined area of the RAM 105. At step 1903, it is determined whether the idle speed control has failed. At step 1903, the determination of the failure of the idle speed control is performed in the same manner as step 505 in FIG. 5. If it is determined that the idle speed control is normal, then at step 1905, a value of a parameter $P_{M1}$ is replaced by the value of the inlet air pressure $P_M$ read at step 1901, and after that, the ignition timing control in the normal operation is performed at steps 1907 through 1915. The operations at steps 1907 through 1915 are the same as those at steps 501, 503, 507, 509 and 523 in FIG. 5.

If it is determined that the idle speed control has failed at step 1903, the routine proceeds to step 1917 which determines whether the value of $P_{M1} - P_M \geq \Delta P_{M0}$ where $P_M$ is the inlet air pressure read at step 1901, $P_{M1}$ is the value of the parameter replaced at step 1905 when the idle speed control was normal and $\Delta P_{M0}$ is a predetermined constant. Since the value of $P_{M1}$ is always replaced by the latest value of $P_M$ if the idle speed control valve is normal, the value of $P_{M1}$ at step 1917 represents the inlet air pressure immediately before the failure of the idle speed control occurs. Namely, at step 1917, it is determined whether the inlet air pressure $P_M$ decreases more than the predetermined value $\Delta P_{M0}$ due to the failure of the idle control.

The reason why the inlet air pressure $P_M$ after the failure is compared with the inlet air pressure before the failure is that, if the amount of bypass air decreases due to the failure of the idle speed control, the inlet air pressure also decreases. FIG. 20 shows the change in the inlet air pressure when the amount of bypass air is decreased by a failure of the idle speed control. As shown in FIG. 20, when such a failure of the idle speed control occurs, the inlet air pressure $P_M$ rapidly decreases immediately after such failure occurs, and the difference between the inlet air pressures before and after the failure becomes larger than the usual fluctuation of the inlet air pressure. Therefore, at step 1917, if the inlet air pressure $P_M$ drops more than a value $\Delta P_{M0}$ after the failure of the idle speed control, it is determined that the amount of bypass air is decreased by the failure of the idle speed control.

When $P_{M1} - P_M \Delta P_{M0}$ at step 1917, since the amount of bypass air is decreased by the failure of idle speed control and the ignition timing retarding operation is not required, the ignition timing control in the normal operation is performed at steps 1907 through 1915. Therefore, the sudden decrease in the engine output torque and the engine stall are prevented from occurring. The value of $\Delta P_{M0}$ is set at a relatively large positive value so that the normal fluctuations of the inlet air pressure do not affect the determination at step 1917.

If $P_{M1} - P_M \geq \Delta P_{M0}$ at step 1917, since this means that the amount of bypass air is increased by the failure of the idle speed control, the ignition timing retarding operation in one of FIGS. 5, 10 and 17 is performed at step 1919. Thus over-running of the engine does not occur.

Though the decrease in the amount of bypass air is determined in accordance with the change in the inlet air pressure $P_M$ after the failure of the idle speed control, determination of the decrease in the amount of bypass air can be determined by other methods. For example, the decrease in the amount of bypass air may be determined from the value $Q_{FAIL}$ used for the calculation of FP in FIG. 16. Namely, if the value of $Q_{FAIL}$ becomes a large negative value after a failure of the idle speed control, it can be determined that the amount of bypass air is decreased by the failure of the idle speed control.

Though the present invention has been described with reference to specific embodiments selected for the purpose of illustration, it should be understood that numerous modifications could be applied by those skilled in the art without departing from the basic concept and scope of the present invention.

What is claimed is:

1. An ignition timing control device for an engine, said engine comprising an inlet air passage and a throttle valve disposed on said inlet air passage, an inlet air bypass passage connecting the portions of the inlet air passage upstream and downstream of the throttle valve for supplying inlet air to the engine without passing through the throttle valve, and an idle speed control means for controlling the idle speed of the engine by adjusting the amount of air passing through the inlet air bypass passage, wherein said ignition timing control device comprises:

an engine load condition detecting means for detecting the load condition of the engine;

a failure detecting means for detecting the failure of the idle speed control means; and, an ignition retarding means for retarding the ignition timing of the engine by an amount determined in accordance with the engine load conditions detected by the engine load condition detecting means when the idle speed control means fails.

2. An ignition timing control device according to claim 1, wherein said engine load condition detecting means comprises an inlet air amount detecting means for detecting the amount of inlet air supplied to the engine, and said ignition retarding means retards the ignition timing of the engine by an amount determined in accordance with the amount of inlet air detected by said inlet air detecting means.

3. An ignition timing control device according to claim 2, further comprising a prohibiting means for prohibiting the ignition retarding means from retarding the ignition timing of the engine when the amount of the inlet air is larger than a predetermined first value, or smaller than a predetermined second value which is smaller than said first value.

4. An ignition timing control device according to claim 1, further comprising a base ignition timing determining means for determining a base ignition timing in accordance with the engine load condition, wherein said ignition retarding means comprises a retardation amount calculating means for calculating the amount of ignition timing retardation in accordance with the engine load conditions and an ignition timing determining means for determining the ignition timing of the engine by adding said amount of the ignition timing retardation to the base ignition timing when the idle speed control means fails.

5. An ignition timing control device according to claim 4, wherein said ignition retarding means further comprises a warming-up condition detecting means for detecting the temperature of the engine and a correcting means for correcting the amount of the ignition timing retardation calculated by said retardation amount calculating means in accordance with the temperature of the engine, and wherein said ignition timing determining means determines the ignition timing of the engine by adding said amount of the ignition timing retardation after it is corrected to the base ignition timing when the idle speed control means fails.

6. An ignition timing control device according to claim 4, wherein said ignition retarding means further comprises an auxiliary load condition detecting means for detecting the load conditions of engine auxiliary equipment and a correcting means for correcting the amount of the ignition timing retardation calculated by said retardation amount calculating means in accordance with the load conditions of the engine auxiliary equipment, and wherein said ignition timing determining means determines the ignition timing of the engine by adding the amount of the ignition timing retardation after it is corrected to the base ignition timing when the idle speed control means fails.

7. An ignition timing control device according to claim 4, further comprising a prohibiting means for prohibiting the ignition retarding means from retarding the ignition timing of the engine when the amount of the inlet air is larger than a predetermined first value, or smaller than a predetermined second value which is smaller than said first value.

8. An ignition timing control device according to claim 1, further comprising a base ignition timing determining means for determining a base ignition timing in accordance with the engine load condition, wherein said ignition retarding means comprises a parameter setting means for determining the value of a parameter in accordance with the magnitude of the influence of a failure of the idle speed control means exerts on the engine operation, a retardation amount calculating means for calculating the amount of ignition timing retardation in accordance with the value of said parameter and an ignition timing determining means for determining the ignition timing of the engine by adding said amount of the ignition timing retardation to the base ignition timing when the idle speed control means fails.

9. An ignition timing control device according to claim 8, further comprising a prohibiting means for prohibiting the ignition retarding means from retarding the ignition timing of the engine when the amount of the inlet air is larger than a predetermined first value, or smaller than a predetermined second value which is smaller than said first value.

10. An ignition timing control device according to claim 1 further comprising a setting means for setting the limiting value of the ignition timing advancing rate and a limiting means for limiting the actual advancing rate of ignition timing to be less than said limiting value, wherein said setting means sets the limiting value smaller when the idle speed control means has failed than the limiting value when the idle speed control means is normal.

11. An ignition timing control device according to claim 1, wherein said failure detecting means comprises a determining means for determining whether the amount of air passing through the inlet air bypass passage decreases due to a failure of the idle speed control means and a prohibiting means for prohibiting the ignition retarding means from retarding the ignition timing of the engine when it is determined that the amount of air passing through the inlet air bypass passage decreases due to a failure of the idle speed control means.

12. An ignition timing control device for an engine, said engine comprising an inlet air passage and a throttle valve disposed on said inlet air passage, an inlet air bypass passage connecting the portions of the inlet air passage upstream and downstream of the throttle valve for supplying inlet air to the engine without passing through the throttle valve, and an idle speed control means for controlling the idle speed of the engine by adjusting the amount of air passing through the inlet air bypass passage, wherein said ignition timing control device comprises:

a failure detecting means for detecting the failure of the idle speed control means;

an ignition retarding means for retarding the ignition timing by a predetermined amount when the idle speed control means fails;

a setting means for setting the limiting value of an ignition timing advancing rate; and, a limiting means for limiting the actual advancing rate of ignition timing to be less than said limiting value, and wherein said setting means sets the limiting value smaller when the idle speed control means has failed than the limiting value when the idle speed control means is normal.

13. An ignition timing control device for an engine, said engine comprising an inlet air passage and a throttle valve disposed on said inlet air passage, an inlet air bypass passage connecting the portions of the inlet air passage upstream and downstream of the throttle valve for supplying inlet air to the engine without passing through the throttle valve, and an idle speed control means for controlling the idle speed of the engine by adjusting the amount of air passing through the inlet air bypass passage, wherein said ignition timing control device comprises:

a failure detecting means for detecting a failure of the idle speed control means;

an ignition retarding means for retarding the ignition timing by a predetermined amount when the idle speed control means has failed;

a determining means for determining whether the amount of air passing through the inlet air bypass passage decreases due to the failure of the idle speed control means; and, a prohibiting means for prohibiting the ignition retarding means from retarding the ignition timing of the engine when it is determined that the amount of air passing through the inlet air bypass passage has decreased due to the failure of the idle speed control means.

* * * * *